Figure 1:
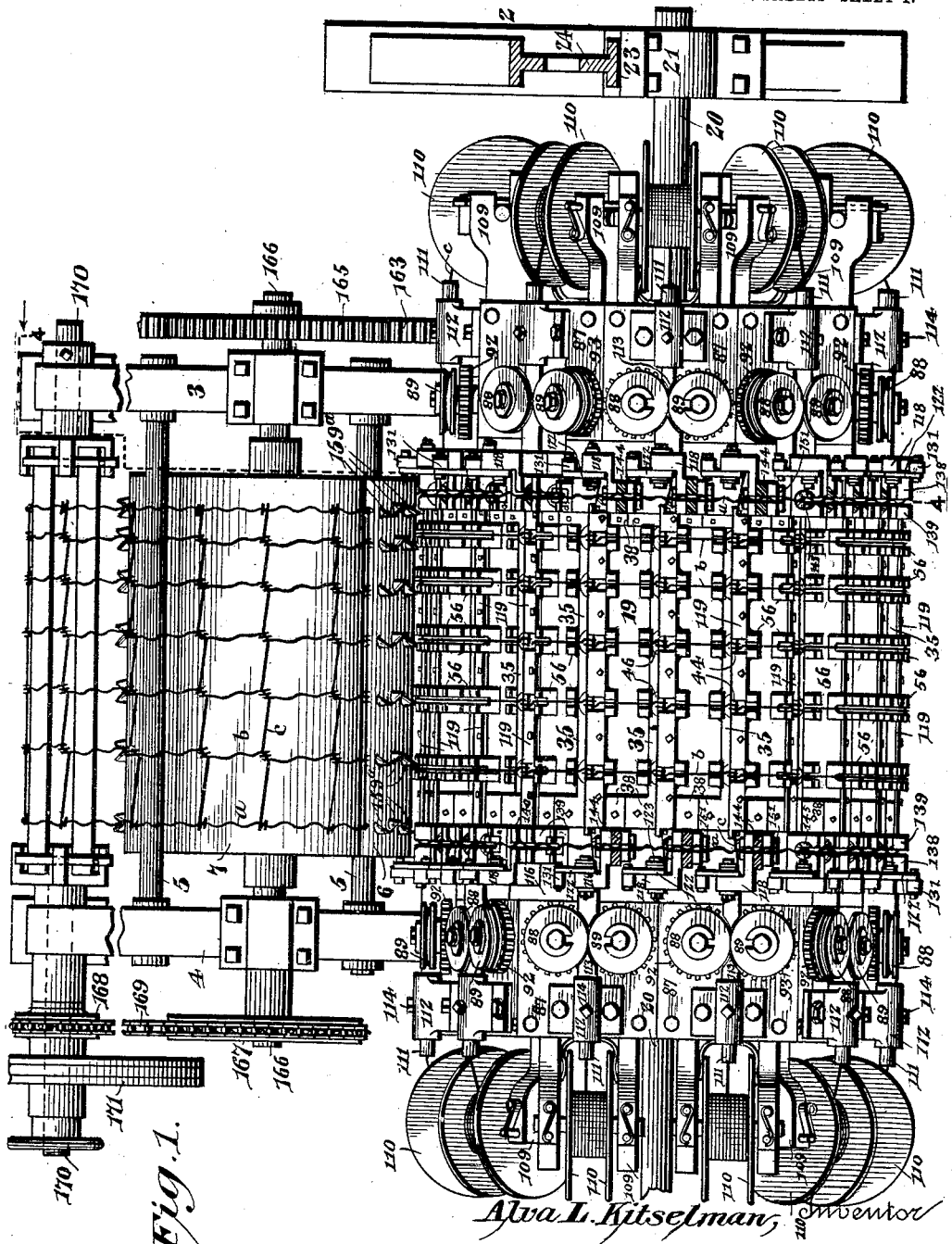

A. L. KITSELMAN.
WIRE FABRIC MAKING MACHINE.
APPLICATION FILED JUNE 11, 1904.

925,639.

Patented June 22, 1909.
17 SHEETS—SHEET 1.

Witnesses
Jas. T. McCathran
Louis G. Julihn

Alva L. Kitselman, Inventor
By E. G. Siggers
Attorney

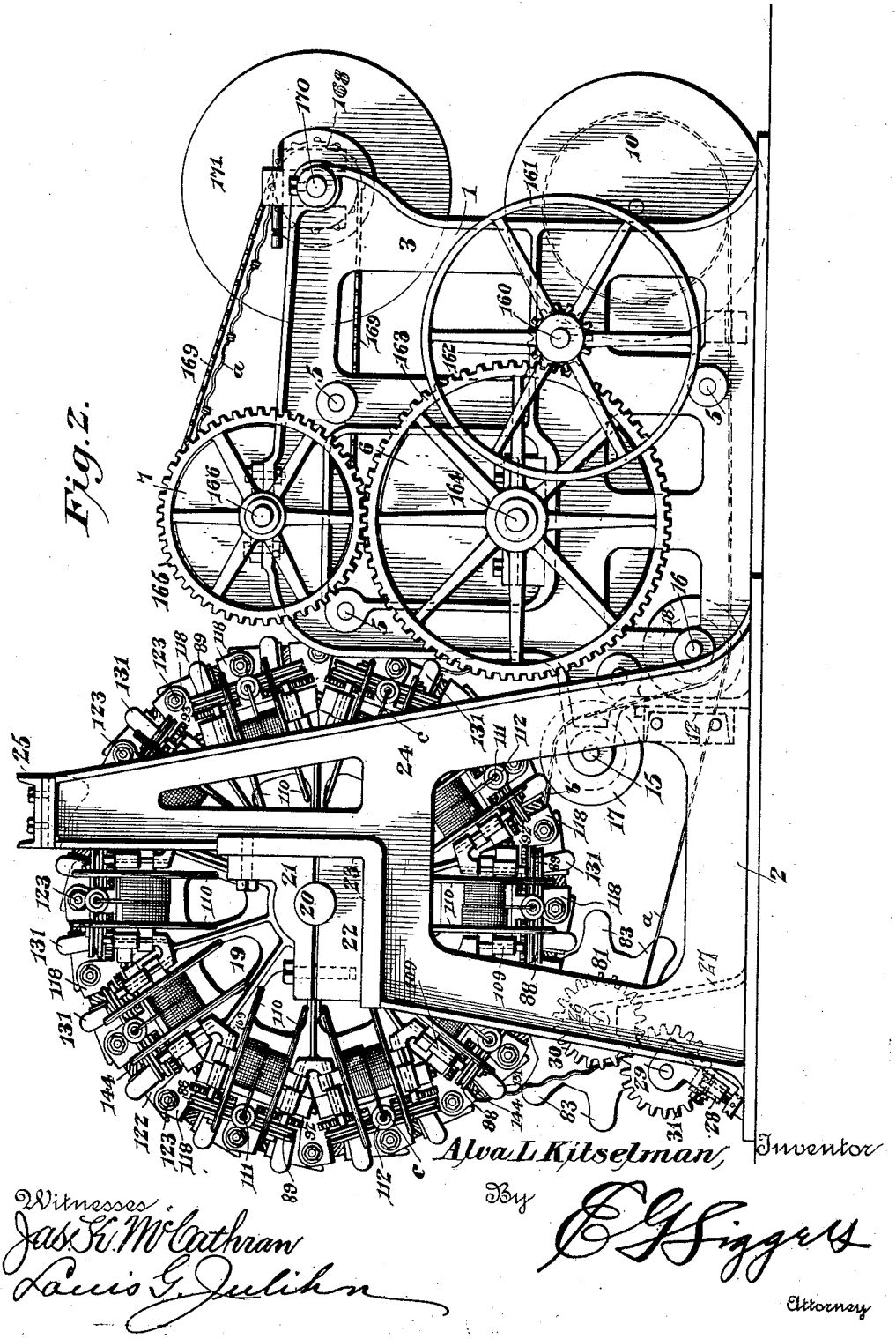

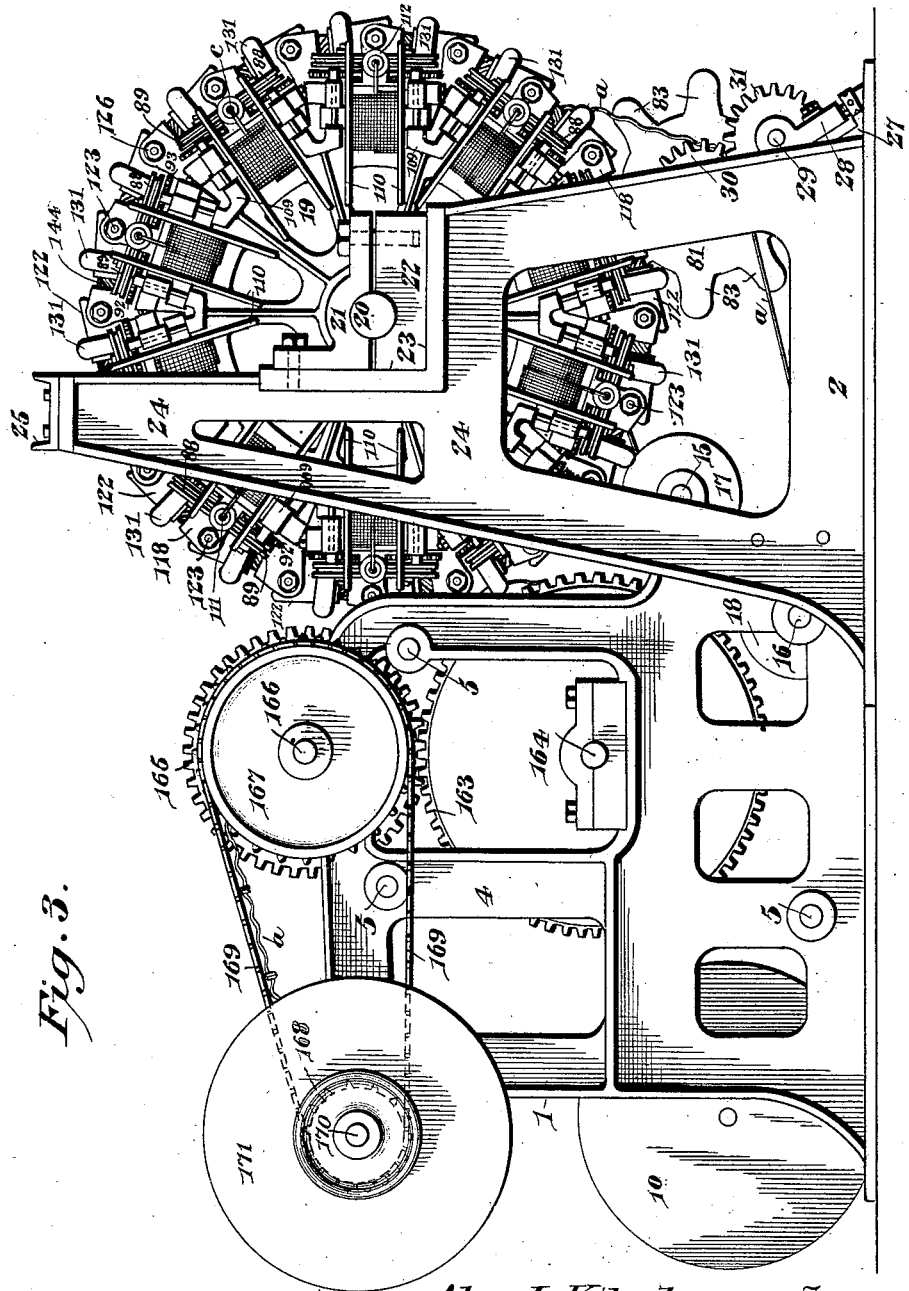

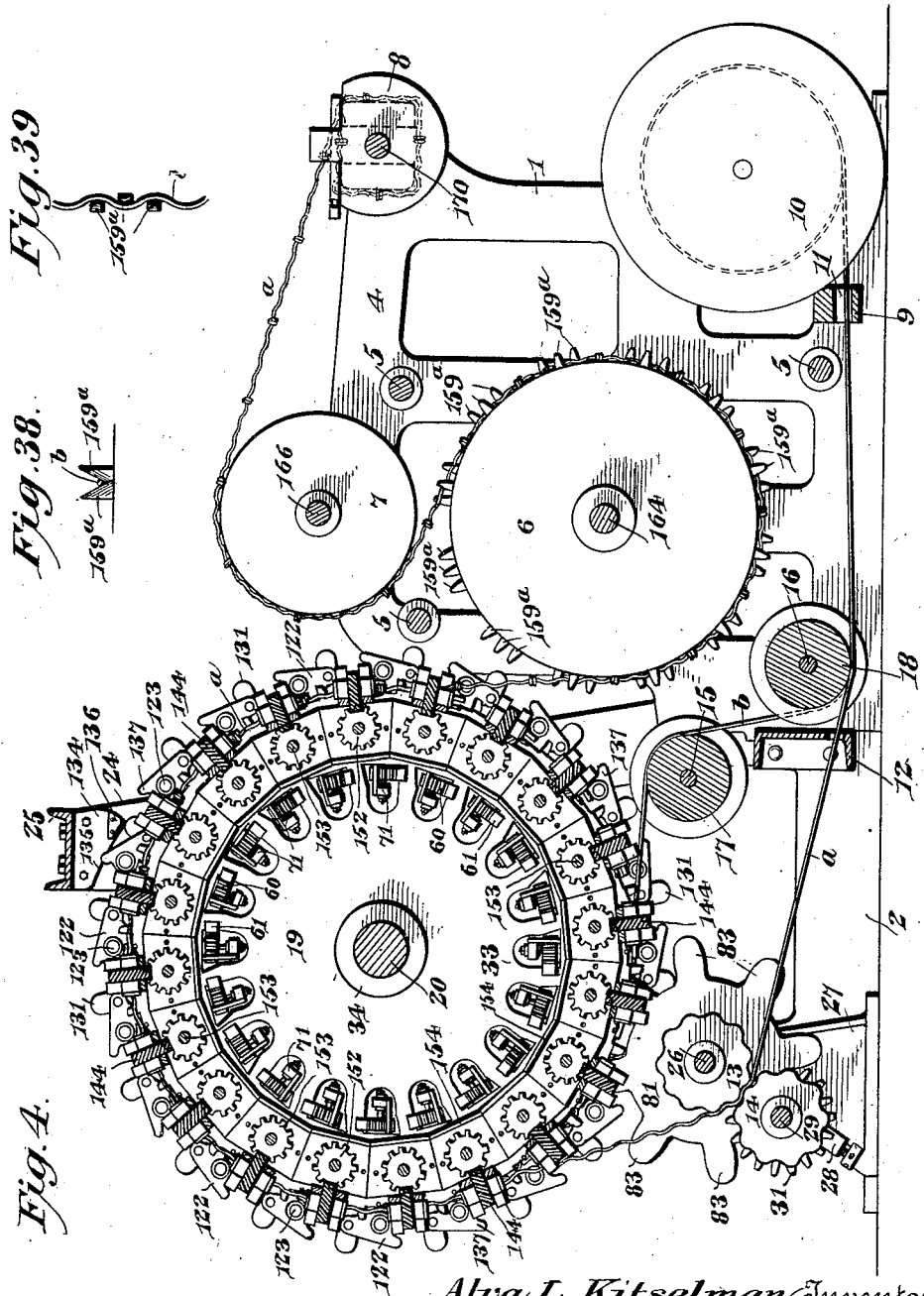

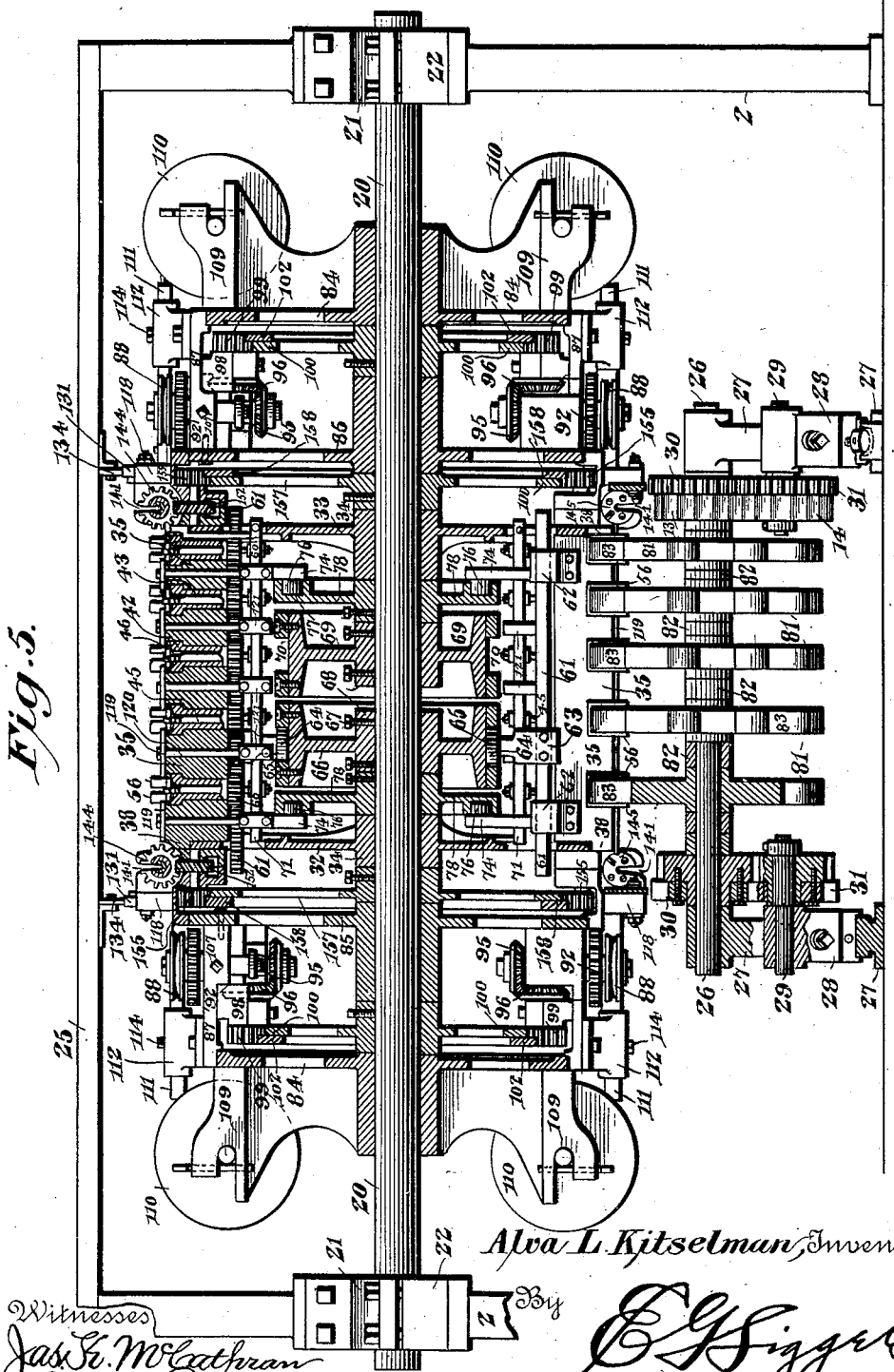

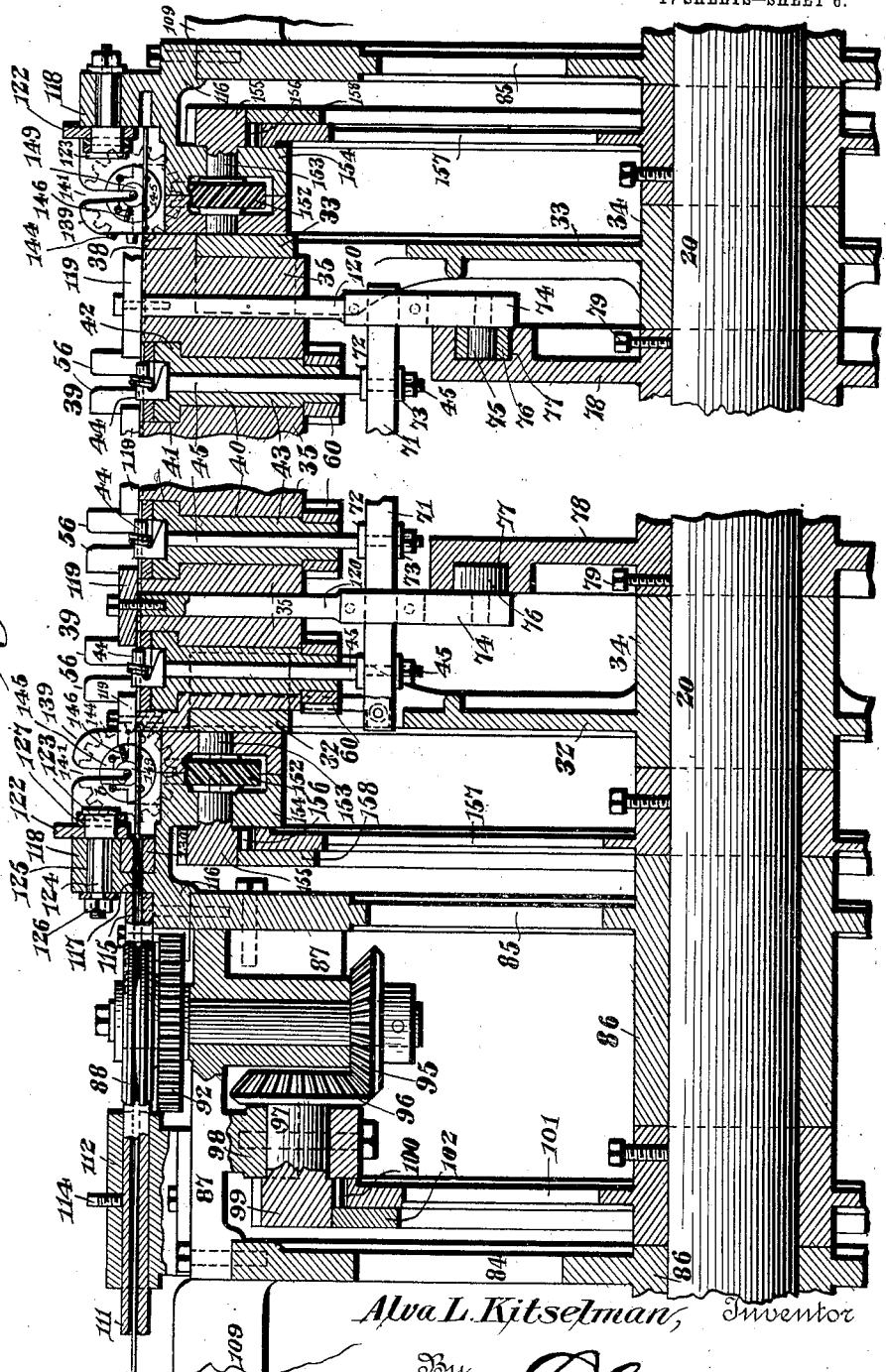

A. L. KITSELMAN.
WIRE FABRIC MAKING MACHINE.
APPLICATION FILED JUNE 11, 1904.
925,639.
Patented June 22, 1909.
17 SHEETS—SHEET 7.
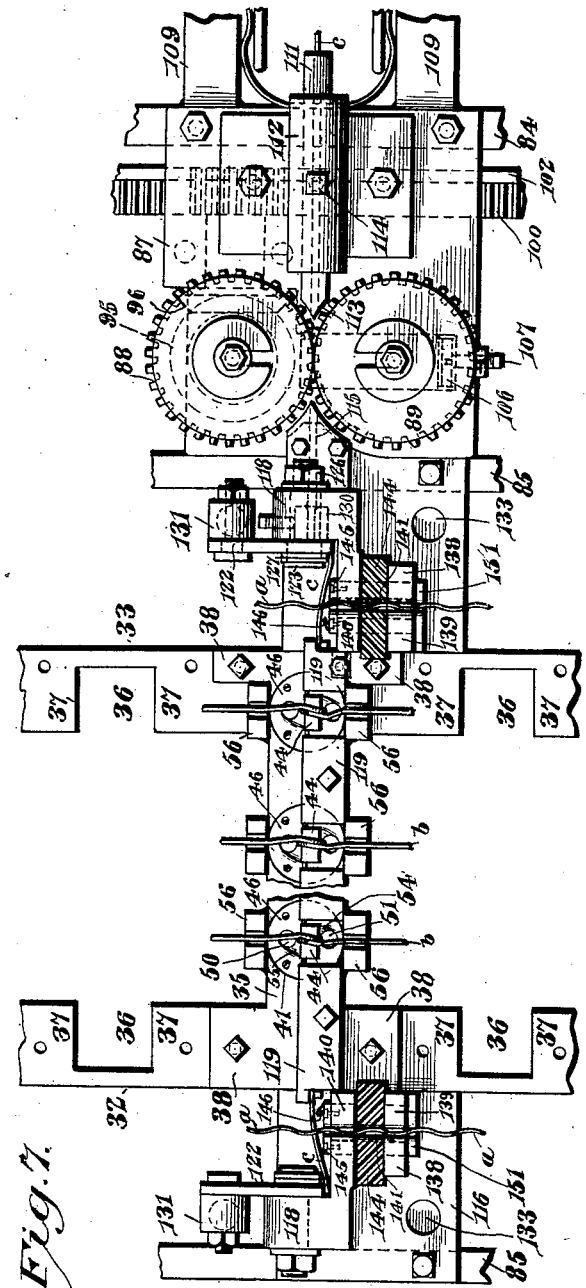
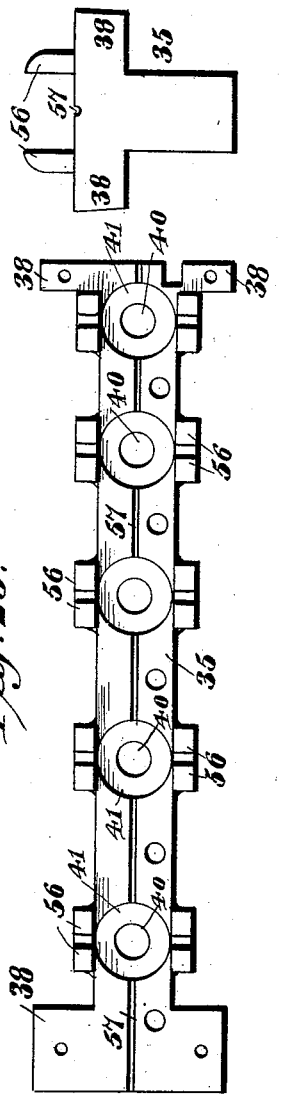

A. L. KITSELMAN.
WIRE FABRIC MAKING MACHINE.
APPLICATION FILED JUNE 11, 1904.

925,639.

Patented June 22, 1909.
17 SHEETS—SHEET 8.

Alva L. Kitselman, Inventor

Witnesses

A. L. KITSELMAN.
WIRE FABRIC MAKING MACHINE.
APPLICATION FILED JUNE 11, 1904.

925,639.

Patented June 22, 1909.
17 SHEETS—SHEET 9.

Alva L. Kitselman, Inventor

Witnesses
Jas. F. McCathran
Louis G. Julihn

By E. G. Siggers
Attorney

A. L. KITSELMAN.
WIRE FABRIC MAKING MACHINE.
APPLICATION FILED JUNE 11, 1904.

925,639.

Patented June 22, 1909.
17 SHEETS—SHEET 10.

Alva L. Kitselman, Inventor

Witnesses

By

Attorney

A. L. KITSELMAN.
WIRE FABRIC MAKING MACHINE.
APPLICATION FILED JUNE 11, 1904.
925,639.
Patented June 22, 1909.
17 SHEETS—SHEET 11.
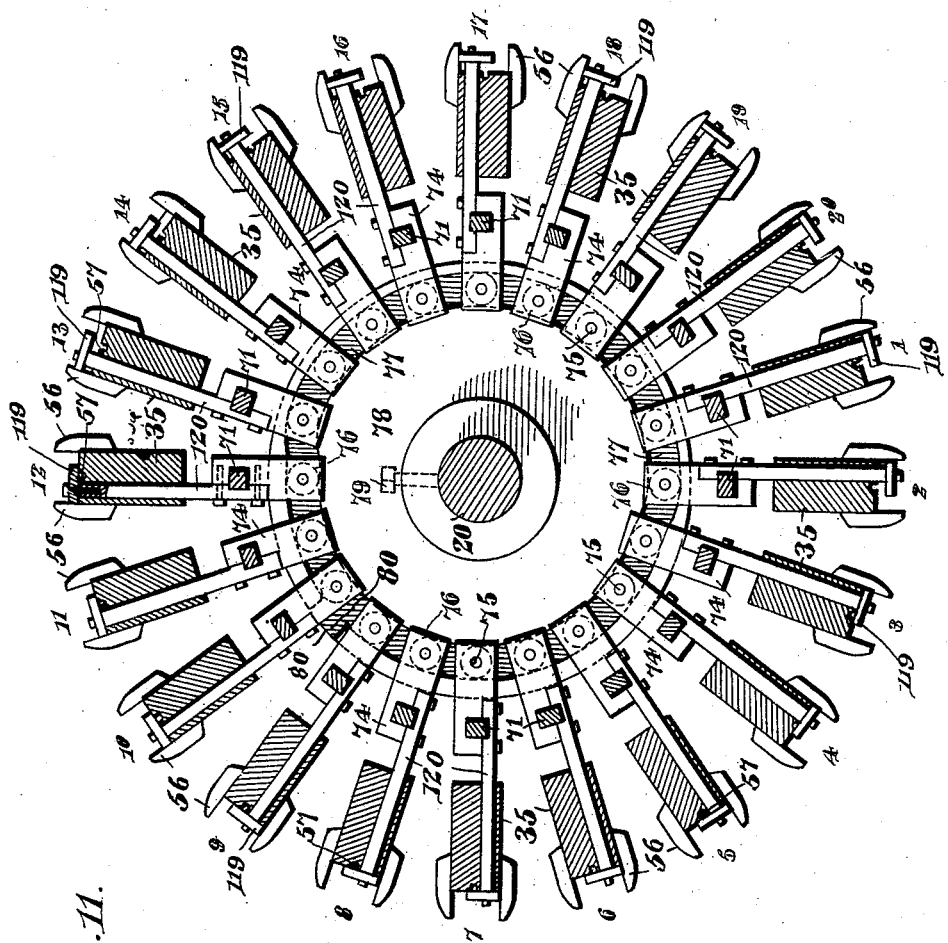

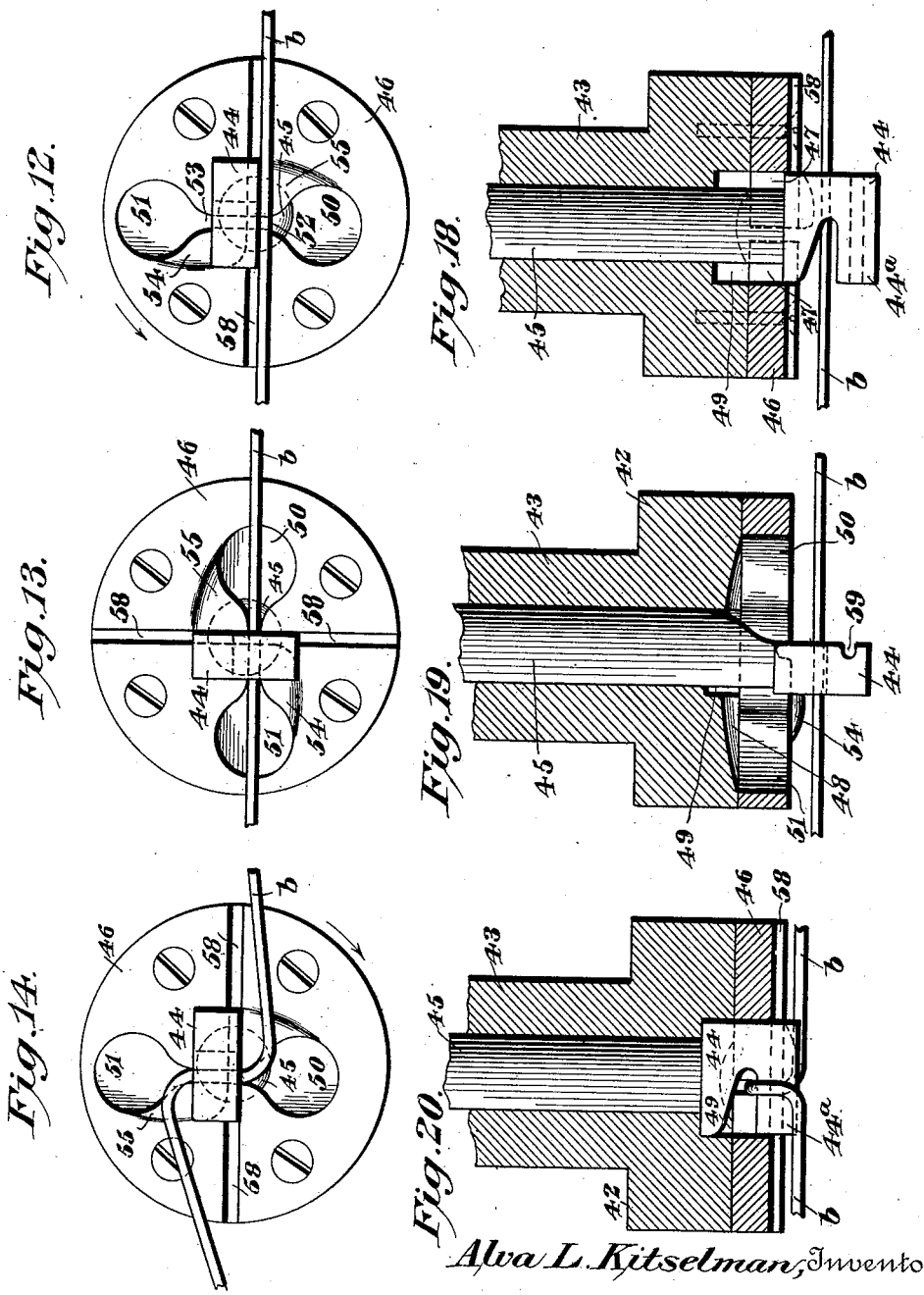

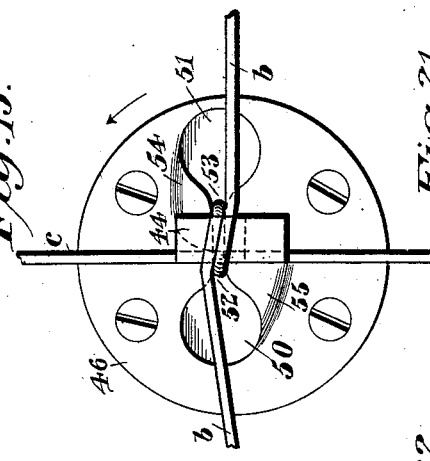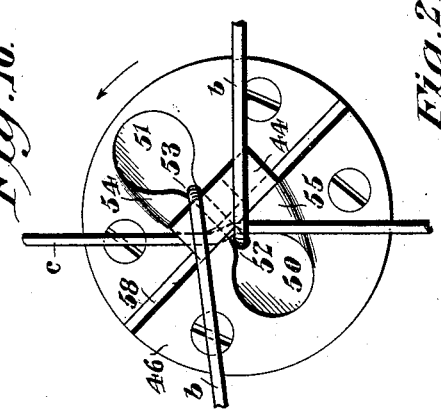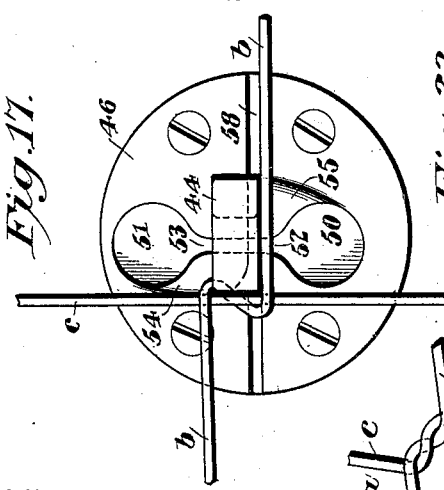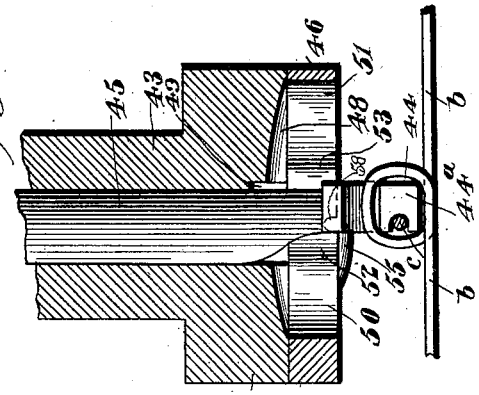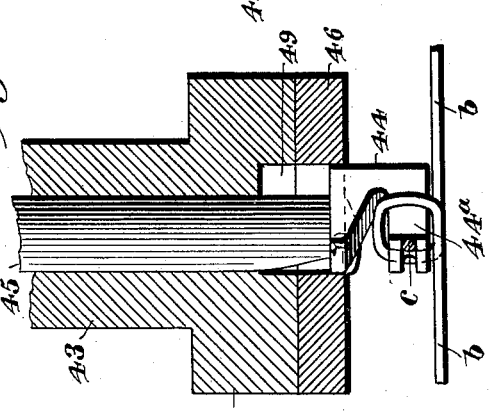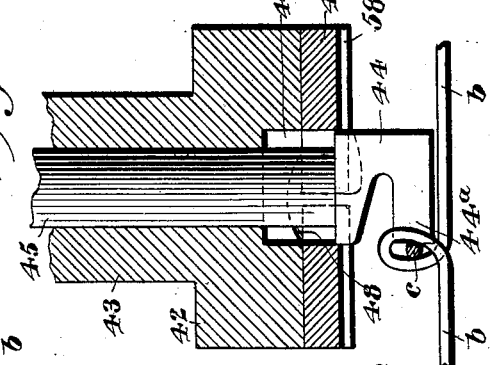

A. L. KITSELMAN.
WIRE FABRIC MAKING MACHINE.
APPLICATION FILED JUNE 11, 1904.
925,639.
Patented June 22, 1909.
17 SHEETS—SHEET 14.
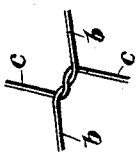
Fig. 25ª
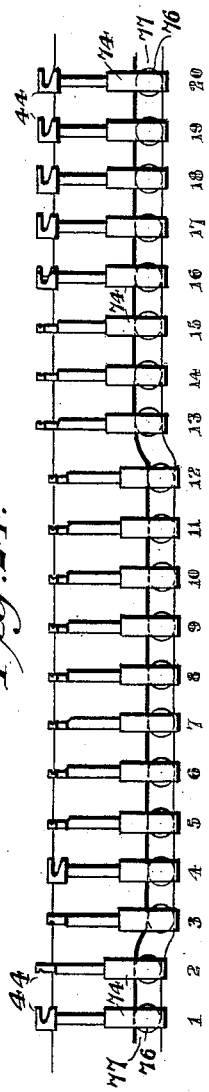
Fig. 24.
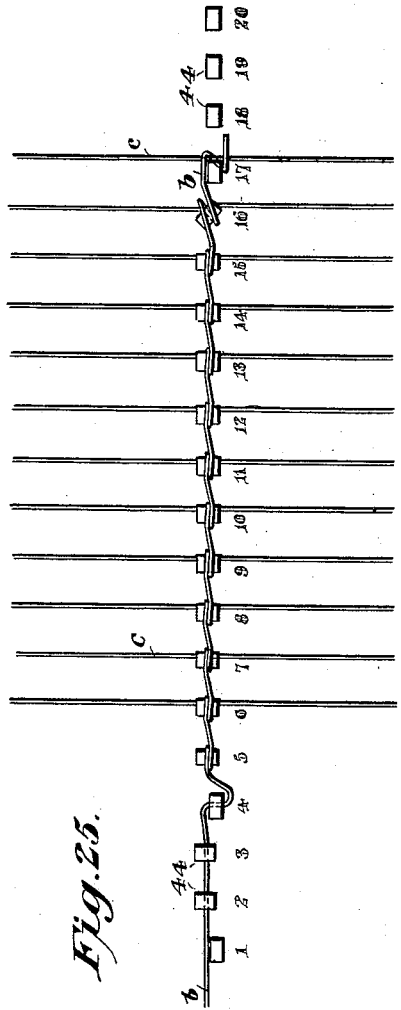
Fig. 25.
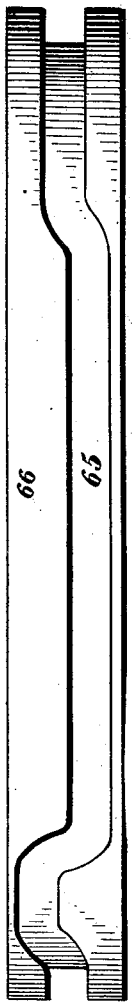
Fig. 26.
Alva L. Kitselman, Inventor
Witnesses
Jas. K. M?Cathran
Louis G. Julihn
By
E. G. Siggers
Attorney

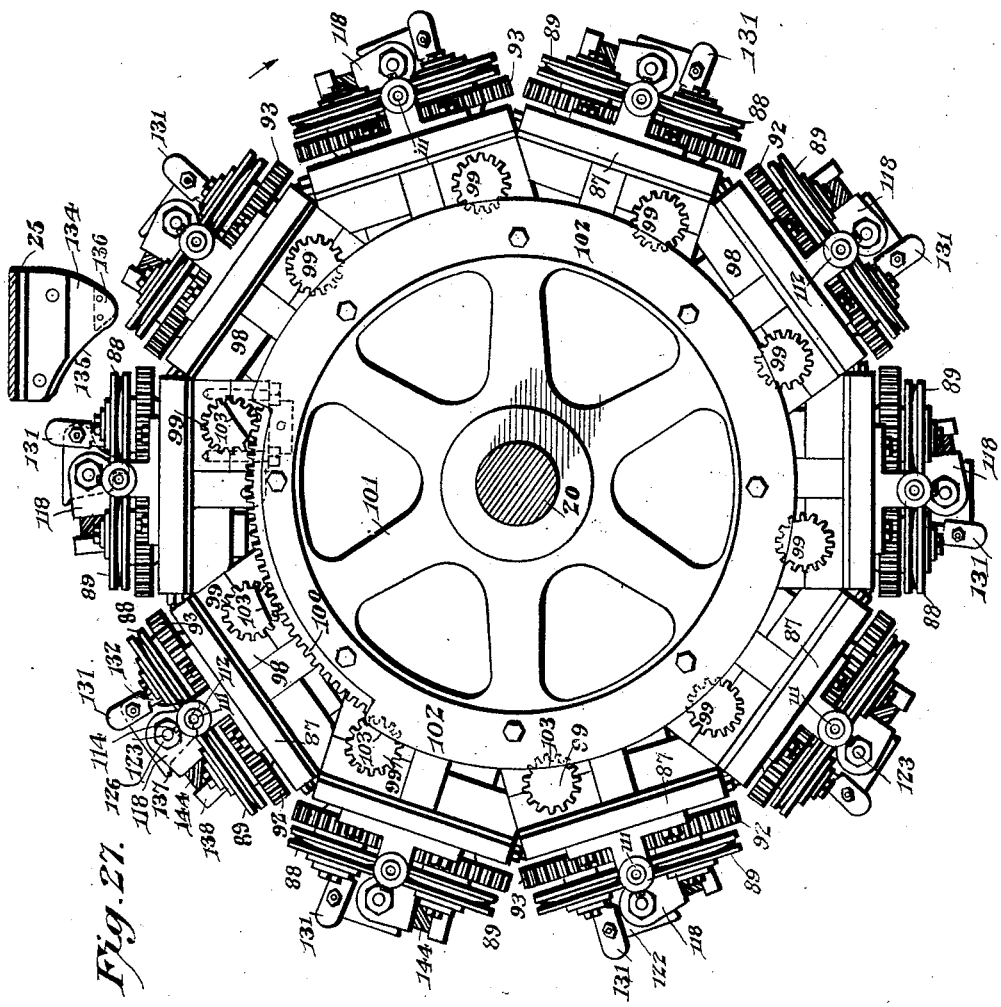

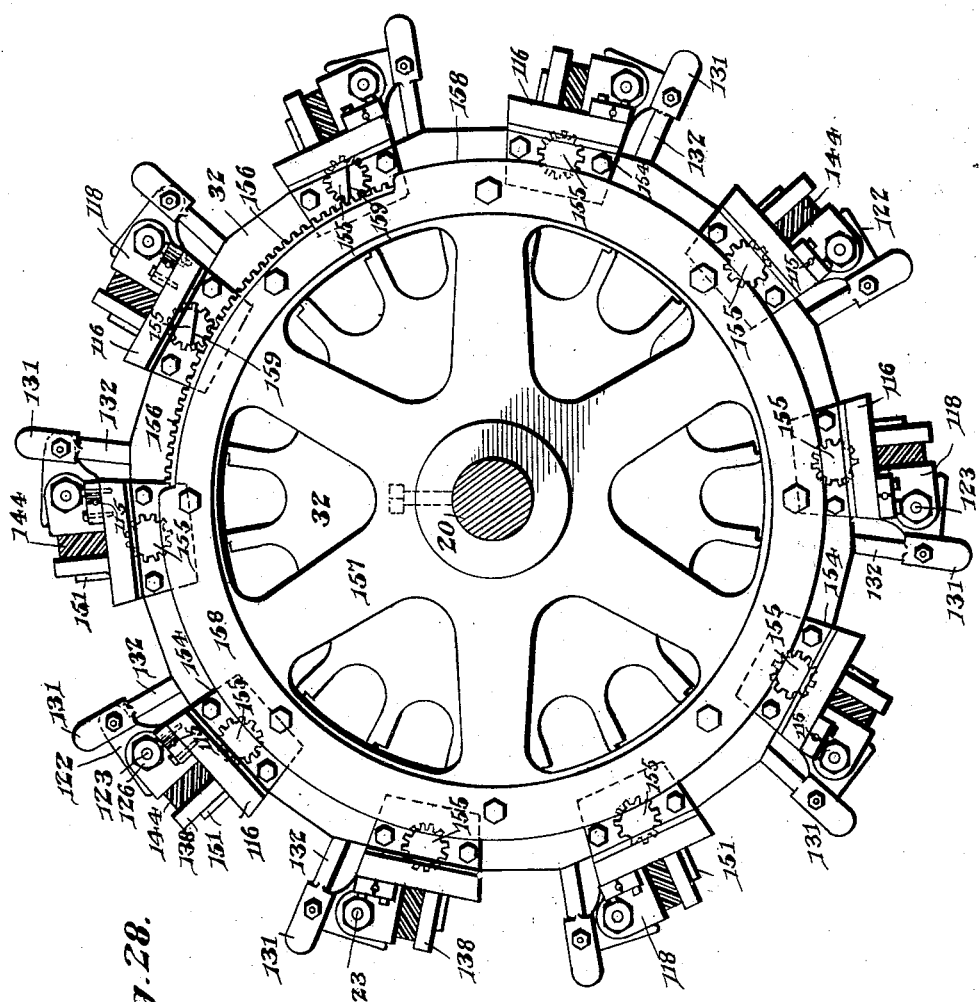

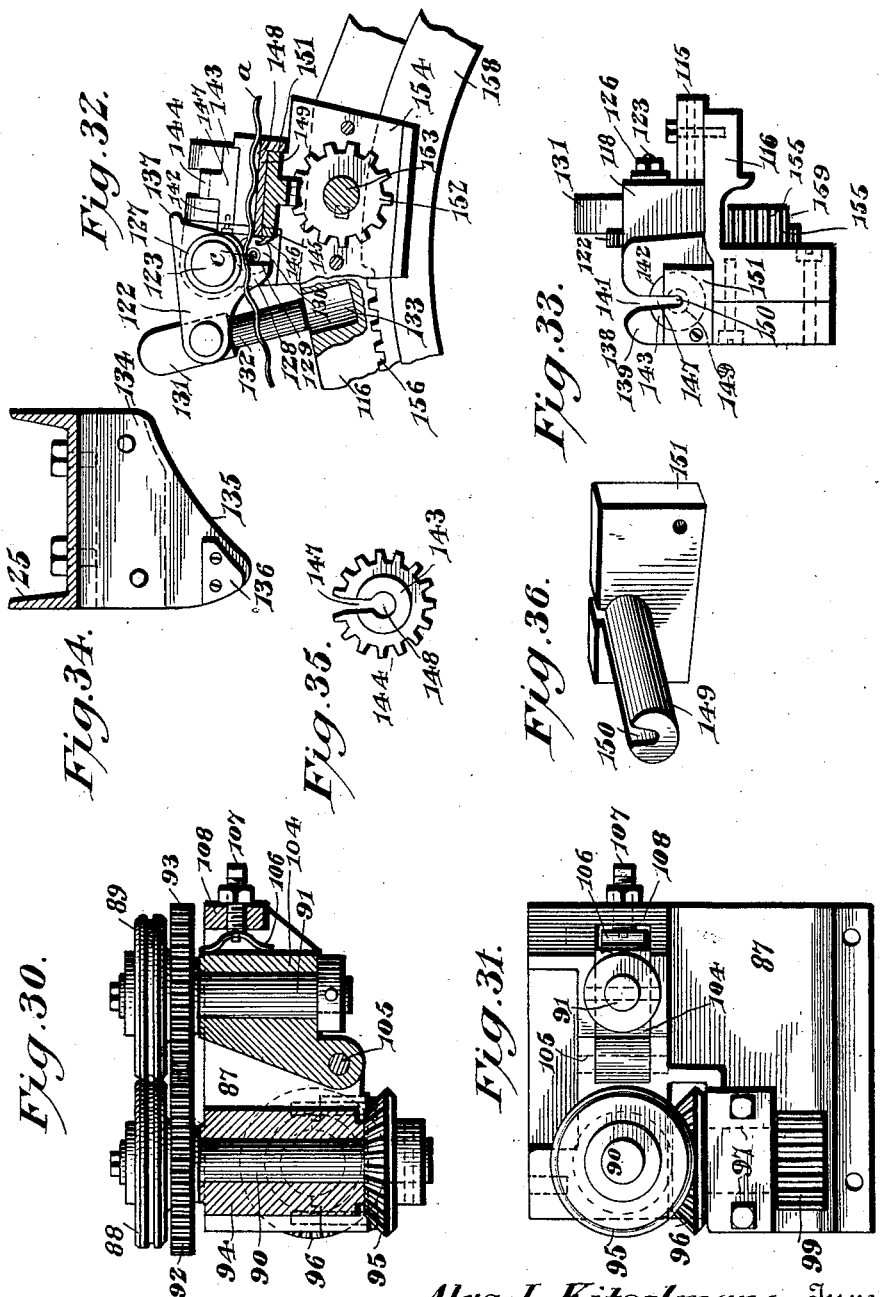

UNITED STATES PATENT OFFICE.

ALVA L. KITSELMAN, OF MUNCIE, INDIANA.

WIRE-FABRIC-MAKING MACHINE.

No. 925,639.            Specification of Letters Patent.            Patented June 22, 1909.

Application filed June 11, 1904. Serial No. 212,195.

*To all whom it may concern:*

Be it known that I, ALVA L. KITSELMAN, a citizen of the United States, residing at Muncie, in the county of Delaware and State of Indiana, have invented a new and useful Wire-Fabric-Making Machine, of which the following is a specification.

This invention relates to a wire fabric making machine designed with special reference to the manufacture of what is known as square mesh fabric, but embodying novel features possessing distinct utility in the manufacture of other styles of fabric and capable, in fact, of effective use in machines of analogous character, for instance, those employed for the manufacture of barbed wire.

The primary object of the invention is to produce a machine the operation of which will be continuous, certain of the wires being fed forward without interruption and the fabric completed during the transit thereof.

Another object is to produce a continuously operating machine of maximum productive capacity requiring a minimum expenditure of power and obviating the necessity for the employment of parts operating at high speed or involving retractile or other lost movements.

Another object is to provide for the continuous feed of the line wires in coöperative relation with a rotary weaving drum equipped with the entire weaving mechanism required to effect the completion of the fabric as the drum and line wires advance in unison.

Still another object of the invention is to provide for the continuous advance of line wires around a continuously rotating weaving drum equipped with devices arranged to apply stay wires to the line wires, at predetermined intervals, without interruption of the feed, the arrangement of the parts being such that, while different styles of fabric may be constructed, that is to say, fabric having a greater or less number of stay wires in a given length, the operating speed and the productive capacity of the machine will, nevertheless, be uniform under all conditions.

Still another object of the invention is to avoid the use of traveling bobbins necessitating the employment of more or less complicated operating mechanism, by providing, in a continuously operating machine, instrumentalities for simultaneously producing coinciding loops in a series of traveling line wires and for passing through said loops a stay wire arranged to be intertwisted with the line wires by the strain imposed upon the fabric.

Another object is to incorporate in the machine structure a weaving drum equipped, as stated, with line wire looping means and means for feeding the stay wires through the loops, and in addition to such means, instrumentalities for severing the stay wires to form the stays, and for twisting the ends of the stays around the margin wires of the fabric by continuously recurring operations, accomplished automatically, and without interruption in the production of the fabric.

Another object of the invention is to effect a local acceleration of the line wire feed in order to produce sufficient slack or surplus in said wires to compensate for the looping and twisting thereof.

Another object is to equip the machine with means for crimping the margin wires in a manner to accommodate the drawing out or lengthening of the fabric incidental to the intertwisting of the line and stay wires by the strain exerted on the fabric.

A further object of the invention is to so group the entire assemblage of devices contributing to the production of the fabric, that they may be mounted in compact form in a single rotating structure, and that the entire fabric making or weaving mechanism may be operated by the advance of the fabric from the weaving mechanism to the storing device or reel and with only a slightly greater expenditure of power than is necessary to draw out the loops in the line wires for the purpose of intertwisting the line and stay wires at their points of intersection.

Subordinate to the general objects stated, are others which will be made apparent during the course of the succeeding description of the illustrated embodiment of the invention.

Figure 8:
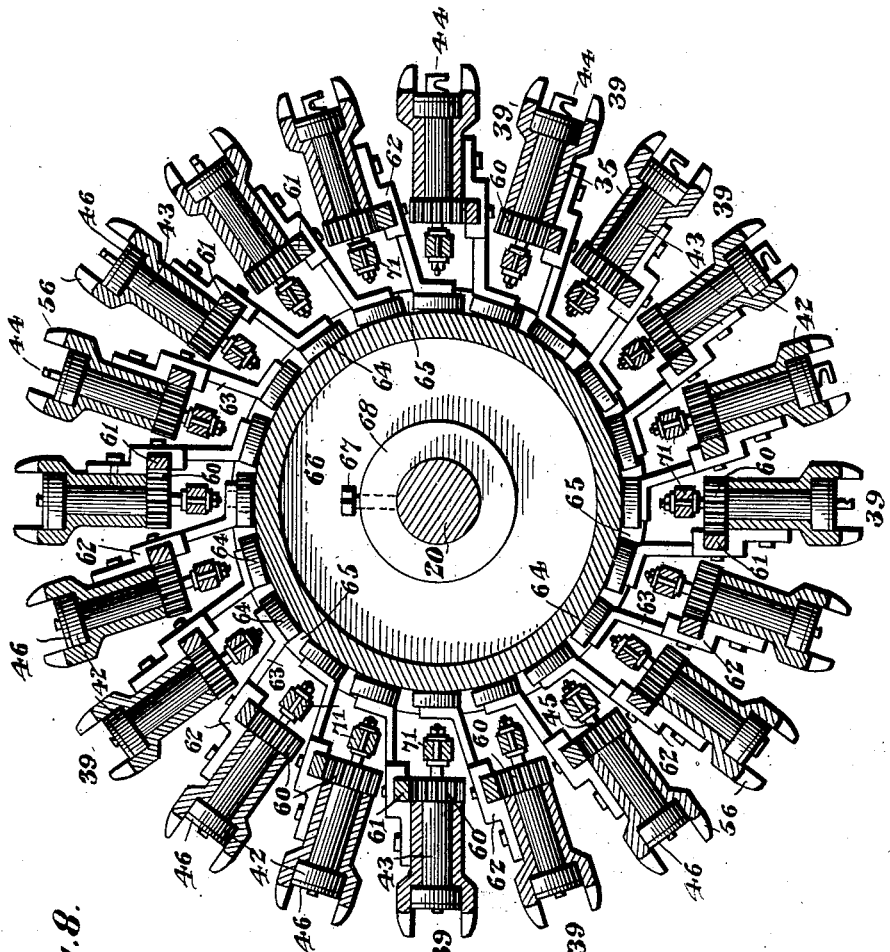
Figure 9:
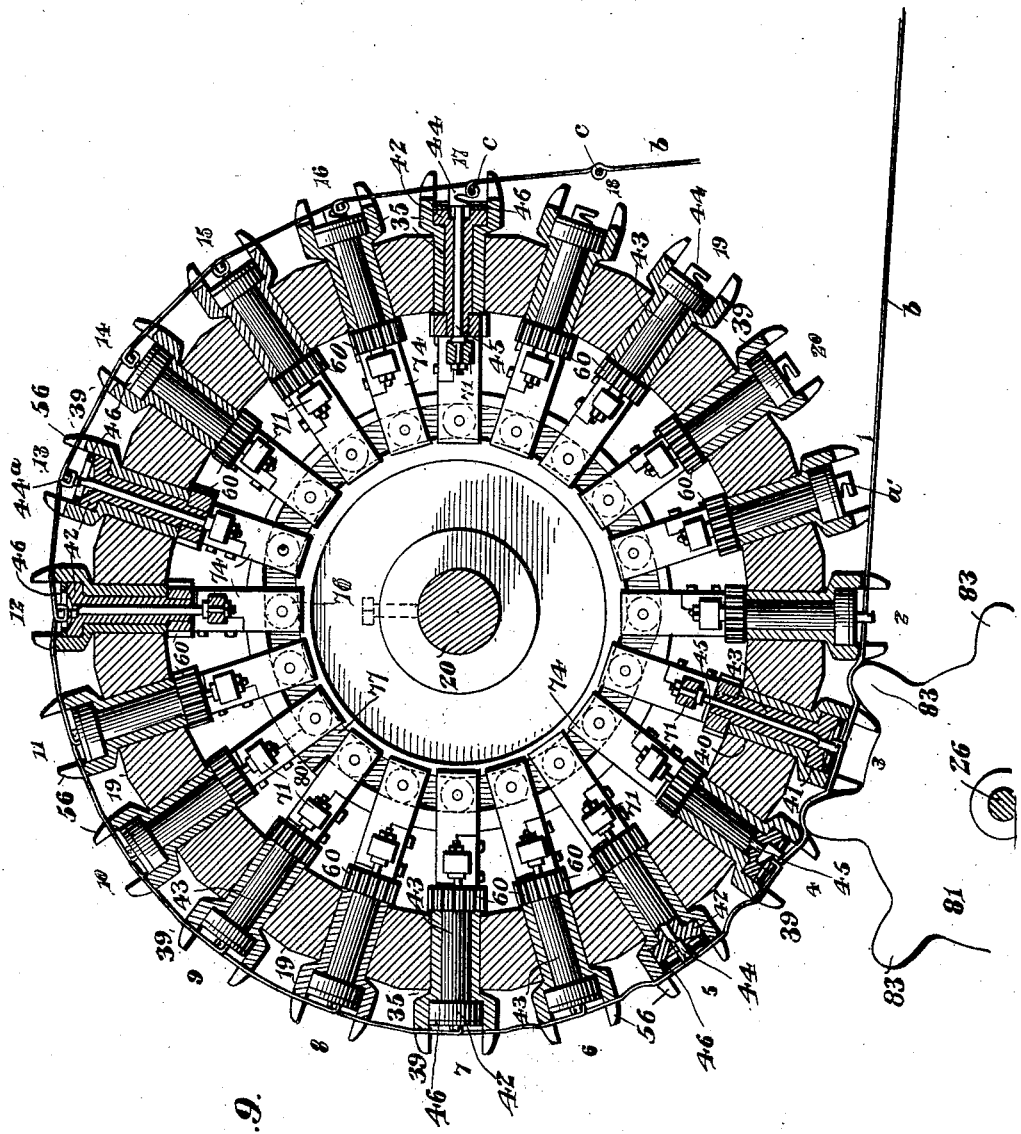
Figure 10:
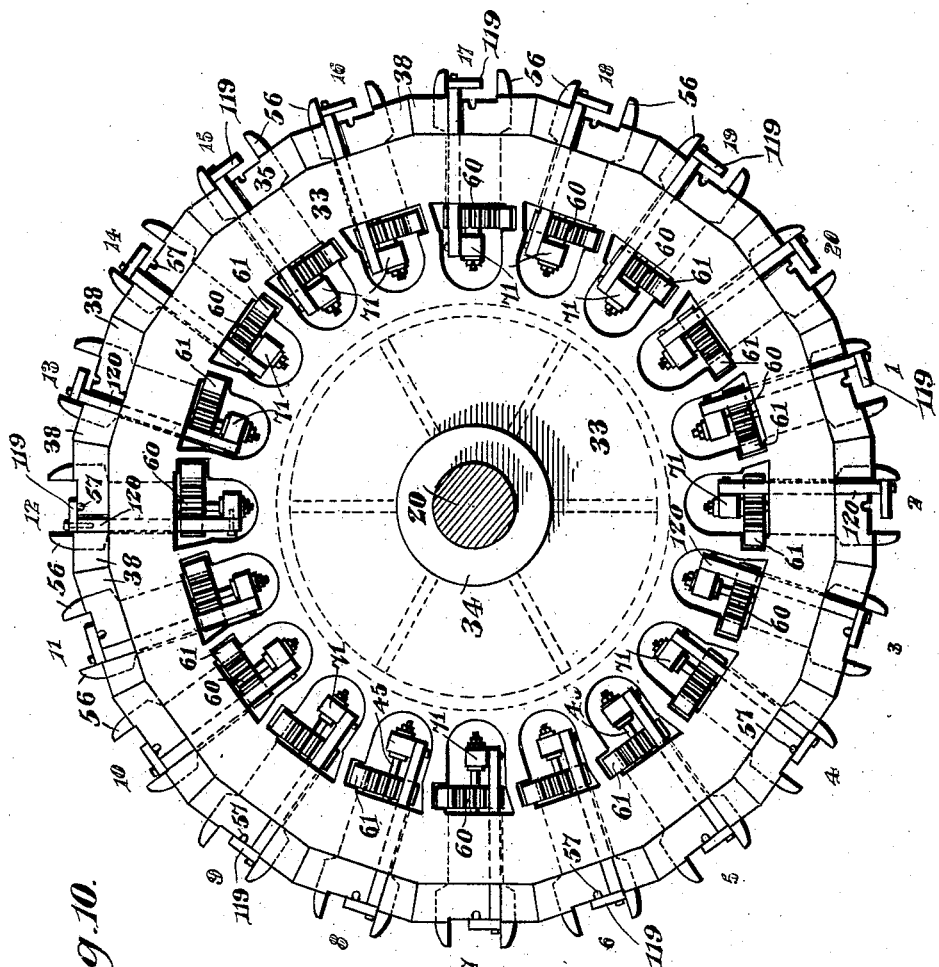

In the accompanying drawings—Figure 1 is a plan view of my complete machine with the exception of one of the supports for the drum shaft. Fig. 2 is a side elevation of the machine. Fig. 3 is a similar view of the opposite side. Fig. 4 is a sectional elevation on the line 4—4 of Fig. 1. Fig. 5 is a vertical transverse section on the line of the drum shaft. Fig. 6 is a similar view of the upper side of the drum on a somewhat enlarged scale and showing certain of the parts broken away. Fig. 7 is an enlarged plan view of one group of mechanism including line wire loopers, stay wire feeding, cutting and deflecting devices, and stay wire twisters. Fig. 8 is a transverse section of the drum with certain of the parts omitted, and designed more particularly to show one circumferential series of line wire loopers and the means for rotating the same. Fig. 9 is another sectional view of the drum with certain of the parts omitted and illustrating more particularly the mechanism for reciprocating the hooks of the line wire loopers. Fig. 10 is an end elevation of the drum with parts removed, and showing more especially the gates and the means for operating the same to close the guide grooves or channels for the stay wires. Fig. 11 is a sectional view designed to further illustrate the same subject-matter. Figs. 12 to 17 inclusive are end views of a line wire looper shown in progressive positions beginning with the initial positions of the parts and ending with the parts in the same positions, but at the end of a cycle of movement, the wire being shown in each of the several views as it appears at the succeeding points in the operation of forming a loop. Fig. 17$^a$ is a detail view showing the intertwist of a line and stay wire after the loop in the line wire has been drawn out. Figs. 18 to 23 inclusive are sectional elevations of the outer end of a line wire looper, the parts being shown in positions corresponding to those shown in Figs. 12 to 17 inclusive. Fig. 24 is a diagrammatic view showing the arrangement of a series of line wire loopers and the cam for reciprocating the same, the several loopers being shown in the positions they assume at different points of their travel around the axis of the drum. Fig. 25 is another diagrammatic view of a series of loopers in their proper positions with respect to their individual axial movement. Fig. 25$^a$ is a detail view of a connecting twist as it appears after the line and stay wires have left a looper at the completion of its function. Fig. 26 is a detail view of the cam for effecting the changes of position of the loopers as delineated in Fig. 25. Fig. 27 is a transverse sectional elevation of the drum, intended to show a series of stay wire feeders located at one end of the drum and omitting that series of twisters located at the same end of the drum for twisting the stay wires fed from the other set of feeders. Fig. 28 is a sectional elevation similar to Fig. 27, but showing the series of twisters at one end of the drum and omitting the stay wire feeders which alternate therewith. Fig. 29 is a detail view of one of the looper supporting bars detached. Fig. 30 is a detail sectional view of one of the stay wire feeding mechanisms. Fig. 31 is a bottom plan view thereof. Fig. 32 is a sectional elevation of one of the twisters and its associated stay wire cutting and deflecting devices. Fig. 33 is an elevation of the subject-matter of Fig. 32 viewed from a position at right angles thereto. Fig. 34 is a detail view of the head beam and one of the cutter operating cams. Fig. 35 is a detail end view of a twister. Fig. 36 is a detail perspective view of one of the fixed center guides employed in connection with the twisters. Fig. 37 is an end view of one of the looper supporting bars, and Figs. 38 and 39 are detail views of a group of crimping pins.

Before proceeding with a detailed description of the machine, it may be well to refer, by way of premise, to its general organization in order that the relation of the various groups of mechanisms may be better understood. The machine, considered as a whole, is of rotary type, all of the primary elements thereof having rotary motion which facilitates their restoration for the successive performance of their several functions without the jar incident to the stopping and starting of reciprocating elements, and without necessitating lost retractile movements.

The line wires are led around a rotary weaving drum from a suitable source of supply, the drum and wires moving together to accomplish the weaving in transit, and the finished fabric having connection with a power driven feed drum continuously operating to maintain the feed of the wires around the drum and the delivery of the completed fabric to a suitable reel. Extending across the periphery of the drum are equidistant series of line wire loopers, corresponding loopers of the several series extending circumferentially around the drum and operating to loop a moving line wire at predetermined intervals.

The loops formed in the several line wires are coincident, and at the proper time in the rotation of the drum, suitable feeding mechanism is brought into play for the purpose of feeding a stay wire across the drum and through the loops of the line wires from a stay wire spool, a spool and feed device being arranged opposite each series of loopers and preferably, though not necessarily, alternating at opposite ends of the drum in the interest of economy of space.

In addition to the line wire loopers and stay wire spools and feeders the drum is equipped with automatically operating means for severing the stays from the wires after they have been properly fed through the line wire loops, and also with stay wire twisters located beyond the ends of each series of line wire loopers and associated with stay wire deflecting devices. These deflecting devices insure the proper engagement of the extremities of the stay by a pair of twisters which operate at the proper time to twist the ends of the stay around the margin wires of the fabric, which latter are crimped by crimping mechanism mounted below the drum adjacent to the wire receiving side thereof. It should be borne in mind that all of these devices operate to perform their recited functions during the movement of the drum and line wires in unison, it being observed that, as a given point of the wire travels with the drum during an extended arc of movement, the several recited mechanisms are given ample time to perform their recited functions in the proper order without necessitating their operation at high speed.

The stay wires, having been passed through the line wire loops and twisted upon the margin wires, the fabric will be completed so far as this given point or portion thereof is concerned, except that the line and stay wires will not have been intertwisted at their points of intersection. In this condition the fabric is delivered from the drum, but since it is engaged at an advanced point by the power operated feed drum, it will be incidentally placed under sufficient tension to draw out the line wire loops and to intertwist the stay and line wires, which is the final step in the manufacture of the fabric.

Each group of devices concerned in the affixing of a stay to the line wires constitutes a weaving set and as these sets are disposed in a circumferential series around the periphery of the drum, and as corresponding functions are performed by each of the several sets at the same points of their travel around the axis of the drum, it follows that within that arc of travel during which the line wires are looped and the stays applied, a number of weaving sets will be located. Furthermore, each of these sets will be in progressively different positions from the receiving to the delivering end of the arc, so that, at the several points defined by the locations of the sets, the fabric will be in different stages of completion. Thus, while the entire active arc of the drum is consumed in the application of a single stay, a completely affixed stay will be delivered from the drum as many times in a single operation of the latter as there are weaving sets in operation, each set effecting the attachment of one stay to the line wires during each rotation of the drum.

Like characters are employed to designate corresponding parts throughout the views.

*The general arrangement of the primary machine elements.*—The supporting structure of the machine, while susceptible of wide variation, is shown as comprising front and rear frames 1 and 2, the frame 2 serving to support the weaving drum and the front frame 1 having supported thereon or associated therewith the instrumentalities concerned in directing the line wires to the weaving drum and in the proper feeding and storage of the completed fabric. The frame 1 comprises a pair of side castings 3 and 4 suitably connected by tie-rods 5 and equipped with suitable bearings for the shafts of a feed drum 6, a tension roll 7 located above the drum, and a reel 8 preferably located, as shown in Fig. 4, at the upper front corner of the frame 1. Adjacent to the bottom of the frame 1 is disposed a transverse guide bar 9, constituting an abutment for the line wire spools 10 and formed with openings 11 through which are passed and guided the several line wires, which term is intended to comprehend all of the wires extending longitudinally of the fabric and including both the margin wires $a$ and the intermediate line wires $b$.

At the lower rear corner of the frame 1 is located a fixed guide 12 for the margin wires $a$ which, after passing therethrough, are extended respectively between crimping rolls 13 and 14 arranged in pairs, as shown in Fig. 5. From the crimping rolls the margin wires $a$ extend to the drum and around a portion of the periphery of the latter, as will be presently explained. The guide 12 for the margin wires is preferably in the form of a channel bar serving as an element of a rigid connection between the front and rear machine frames. Adjacent to the guide 12 two transverse shafts 15 and 16 are mounted in the frame 1 for the support of two series of guide rolls 17 and 18 located in different horizontal and vertical planes, as clearly shown in Fig. 4, and peripherally grooved. The end rolls of the lower series assist in guiding the margin wires $a$, while the remaining rolls of both series receive and guide the intermediate wires $b$, which are thus caused to pass to the lower side of the drum in a plane tangential to its periphery.

The weaving drum, indicated as a whole by 19, is mounted to rotate loosely on a fixed drum shaft 20 having its opposite ends retained between clamping members 21 and 22 for the reception of which seats 23 are provided in the side castings 24 of the rear frame 2. In advance of the seat 23 the side castings 24 of the rear frame are extended vertically to a point above the plane of the drum and are connected by a transverse head beam 25, which not only serves to connect the side castings of the rear frame, but also constitutes a support for a pair of cutter operating cams, as will appear hereafter.

From the construction as thus far described, the general arrangement of the machine will be understood.

The wires are fed from the line wire spools 10 to the weaving drum 19 by way of the intermediate guides, the margin wires being passed between the crimping rolls before reaching the drum. The manufacture of the fabric is effected during the travel of the wires around an active arc of the drum 19; and from the drum the completed fabric is withdrawn by the feed drum 6, and, after passing around the tension roll 7, is wound upon the reel 8. (See Fig. 4.)

In describing the various devices or mechanisms which contribute to the construction of the fabric they will be considered, as far as possible, in the order in which they coöperate with the line wires.

*The margin wire crimping mechanism.*—The crimping rolls 13 and 14 are arranged in pairs, as stated, preferably at a point below the weaving drum 19 and in rear of the central vertical plane thereof, see Figs. 2 and 4. The upper rolls 13 are mounted on a rotary shaft 26 journaled in a pair of standards 27 in which are mounted adjustable bearing boxes 28 carrying stud shafts 29 for the support of the lower crimping rolls 14 which are thus mounted for adjustment relative to the upper rolls 13. The several crimping rolls are loosely mounted upon their respective shafts and the rolls of each pair are geared together by spur pinions 30 and 31 which insure their rotation in unison. (See Figs. 2, 4 and 5.)

*The weaving drum.*—It has been heretofore explained that the drum 19 supports a series of weaving sets distributed around the periphery thereof and each embodying corresponding mechanisms performing distinct functions. Inasmuch, however, as it is impossible to separate the description of these several sets of mechanisms from that of the correlated drum structure, I will describe the entire organization of the drum, with respect to the different kinds of mechanism in order, instead of attempting a description of an individual weaving set. The drum includes in its organization a pair of substantially circular heads 32 and 33 having hubs 34 mounted to revolve freely on the drum shaft 20. Between the peripheries of these heads, as shown in Fig. 10, and retaining the same in spaced relation, are extended a series of looper bars 35 having their opposite ends received by notches 36 in flanges 37 extending inwardly from the heads, as shown in Figs. 6 and 7. In addition to this interfitting relation of the looper bars and heads, the bars are formed with bolt lugs 38 bolted to the peripheral faces of the heads, as shown in Fig. 7. The number of looper bars 35 mounted on the drum is immaterial, although twenty are shown in the present construction, see Fig. 10.

*The line wire loopers.*—Each looper bar 35 is equipped with a transverse series of line wire loopers 39 arranged in position to engage and loop the several intermediate line wires passed around the drum. That is to say, corresponding loopers of each transverse series are arranged to operate upon the same intermediate line wire at different points. As shown in Figs. 8 and 9, each looper bar 35 is provided at proper intervals with cylindrical sockets 40 having an enlarged outer end 41. Each line wire looper 39 comprises a rotary head 42 from which extends a reduced spindle 43 revolubly mounted in the socket 40 with the head 42 accommodated by the enlarged end 41 thereof. The looper also comprises a looping hook 44 having a cylindrical shank 45 extended through the spindle 43, as shown in Fig. 6. The hook 44, constructed as best shown in Figs. 12 to 23 of the drawings, is rectangular in form and is preferably somewhat narrower than its shank 45 in order to bring one side face of the hook substantially in line with the axis of the shank. The angular contour of the hook is designed to compel its rotation in unison with the head 42, since the latter is provided with a face plate 46 formed with a socket 47 for the reception of the hook and corresponding in contour therewith. Beyond the inner face of the plate 46 the head 42 of the looper is formed with a cavity 48 extending from the opposite sides of an inward extension 49 of the socket 47. Opposite the ends of this cavity 48 the face plate 46 is pierced by openings 50 and 41 preferably, though not necessarily, of circular form, as shown in Fig. 12, and connected with the socket 47 by comparatively narrow throats 52 and 53. Beyond the opposite sides of the socket 47 and at opposite ends thereof, the face plate 46 is formed with cam lugs or guides 54 and 55 which rise from the plane of the plate to the plane of the outer face of the looper hook 44 when the latter is drawn back or retracted to the position indicated in Fig. 20. These projections or guides 54 and 55 are designed to facilitate the rotation of the looper without interference from the line wire, as will appear more fully hereinafter.

*The guides for the stay and intermediate line wires.*—At diametrically opposite sides of each twister each twister bar 35 is equipped with alined notched lugs 56 constituting guides insuring the location of the intermediate line wires in proper relation to the loopers, see particularly Figs. 6, 7 and 9. In addition to these line wire guides, it is necessary to associate with each transverse series of twisters continuous guiding means for properly guiding the stay wire as it is fed transversely across the drum and through the line wire loops in a manner to be explained. Therefore, in the outer face of the looper bar 35 is formed a stay wire guide groove 57, interrupted by the several looper sockets in the bar, but alined in one position of the loopers with guide grooves 58 in the outer faces of the looper heads. These guide grooves 58 are in turn interrupted by the sockets 47, but the continuity of the guide is, nevertheless, established in given positions of the looper hooks by stay wire grooves or channels 59 formed in one side face of each hook.

*The operation of a line wire looper.*—In order that the succeeding description of the looper operating mechanism may be clearly comprehended, one complete operation of one looper will be first described. At that point where any given intermediate line wire approaches the periphery of the weaving drum, the adjacent looper occupies what may be termed a normal position, shown in Figs. 12 and 18 and also at $a'$ in Fig. 9, the line wire and the looper hook being disposed in parallel relation. As the drum continues to rotate with the looper and the line wire advancing in unison, certain rotary movements will be imparted to the looper as a whole, as indicated diagrammatically in Fig. 25, and certain reciprocatory movements will be imparted to the looper hook, as shown diagrammatically in Fig. 24. By referring to these figures for the minutiæ of the movements and by referring to the selected positions shown in Figs. 12 to 17 inclusive, together with the corresponding sections shown in Figs. 18 to 23 inclusive, the operation of forming a loop in the line wire will be clear. As the looper and line wire are advanced in unison by the rotation of the drum, the looper as a whole will be given a quarter turn in the direction of the arrow in Fig. 12 from the position shown in said figure to the position shown in Fig. 13. This movement of the looper will present the hook over the intermediate line wire $b$. (See the second positions in Figs. 24 and 25.) The looper hook will next be drawn back (third position) to carry back a portion of the wire into the cavity in the head. As the looper advances from the third position it will be rotated in the opposite direction and having made a quarter turn, will appear as in position 4, see also Figs. 14 and 20. In this, the fourth position, the looper will be disposed precisely as in the first position except that the hook will be in the retracted position and that the wire will be engaged in the hook preparatory to the formation of the loop. The rotary movement of the looper is not arrested in the fourth position, but continues until another quarter turn is accomplished for the purpose of completing the formation of the loop, the cam lugs 54 and 55 facilitating this action by riding under those portions of the line wire extending in opposite directions from the hook and thus urging the main portions of the wire outwardly from the face of the loop to permit the ends of the hook to pass freely under the wire as the position of said hook is reversed. The looper will now have reached the fifth position indicated in Figs. 24 and 25 and clearly shown in Fig. 15, the loop being disposed around the looping finger $44^a$ of the hook 44. It will of course be understood that since the several loopers of each transverse series will move synchronously, they will all be in the described position, the several hooks being drawn in to present the grooves 59 of the hooks in alinement with the grooves 58 of the heads, which latter grooves are likewise in alinement with the stay wire channel 57 in the looper bar. Maintained in this position, the loopers will now travel with the drum from the fifth to the twelfth position, during which travel a stay wire $c$ will be fed across the drum and through the several line wire loops surrounding the looping fingers of the transverse series of loopers, it being obvious that the stay wire will be properly guided by the continuous stay wire channel defined by the several grooves 57, 58 and 59.

During the travel of the looper from the twelfth to the thirteenth position, the hook will be projected to the position shown in Fig. 21, thus freeing the loop thereon from the cavity in the looper head. During this movement also the stay will be severed and its opposite ends will be deflected to, and engaged by, the stay wire twisters, to be described. During the succeeding travel of the looper from the thirteenth to the fifteenth position, the ends of the stay wire will be twisted around the margin wires and this operation having been completed and the fabric completed at this point, except as to drawing out of the loops, the twister will now be rotated in the opposite direction, that is to say, back to its initial position. This operaton occurs during the travel of the looper from the fifteenth to the seventeenth position, the sixteenth position being clearly shown in Figs. 16 and 22 with the release of the loop effected, and the seventeenth position being shown in Figs. 17 and 23 with the several elements of the looper in their initial positions and the line and stay wires completely withdrawn or released from the hook and ready to be intertwisted by the strain imposed upon the fabric by the feed drum. This intertwisting of the wires occurs immediately after said wires are released from the looper located in the seventeenth position, the connection formed by drawing out the line wire loop being clearly shown in Fig. $25^a$. During the travel of the looper from the seventeenth position, where it has completed its function, to the first position where a repetition of its operation is inaugurated, said looper performs no function and has no rotary or reciprocatory movement.

The operation of a series or set of line wire loopers during one complete rotation of the drum will be clear from the above description, and, as each series operates in the same manner, it will be noted that instead of regarding the several loopers shown in Figs. 23 and 24 as different positions of the same looper, they may be regarded as corresponding loopers of the several series surrounding the drum, since such corresponding loopers will at any given time occupy the successive positions shown in these figures.

*The looper operating mechanism.*—We have seen that the proper operation of the loopers embodies certain rotary movements of each looper as a whole and certain recipratory movements of the looper hook. These movements are translations of the rotary movement of the drum, the translations being effected through the instrumentality of fixed cams mounted on the drum shaft and coöperating with racks for rotating the loopers at the proper time and in the proper direction, and hook operating bars which project and retract the hooks at the proper points without interfering with that rotary movement of the hooks imparted thereto by the racks.

Upon the inner end of each looper spindle 43 is keyed, or otherwise secured, a looper pinion 60 disposed close to the inner face of the looper bar 35 in which the spindle is mounted. The several pinions 60 of each transverse series of loopers are disposed in mesh with one of a series of looper rotating racks 61 mounted in suitable guide brackets 62 carried by the adjacent looper bar or support 35, as shown in Figs. 5 and 8. Each rack 61 is provided with an inwardly extending arm 63 upon the inner extremity of which is mounted an anti-friction roller 64 traveling in the peripheral cam groove 65 of a looper-rotating-cam 66 fixed to the stationary shaft 20 by any suitable means, as for instance, set-screws 67 passed through the hub 68 of the cam, as clearly shown in Fig. 5. The specific construction of the cam 66 is not material, but by preference its rim is of sectional form, as shown, to facilitate repair when necessary. As the drum revolves around its shaft 20, the rollers 64 associated with the respective racks 61 will travel around the fixed cam 66 and being guided in a circuitous path by the cam groove 65, will cause the racks to be reciprocated at the proper times and in the proper directions to effect the rotary movements of the line wire loopers specified during the description of the operation thereof. At this point attention may be directed to the fact that, if desired, the fabric may be constructed with each alternate transverse row of twists extended in opposite directions, that is to say, disposed at opposite angles with respect to the line wires. To effect this variation it is simply necessary to reverse the direction of the described rotary movements of each alternate row of loopers, it being obvious that reverse loops may be formed by the loopers with equal facility. In order to provide for the manufacture of the fabric having alternate reverse twists throughout the length of each line wire, a second looper-rotating-cam 69 is mounted on the shaft 20 adjacent to the cam 66, the groove 70 in the cam 69 being so formed that alternate racks may be provided with arms having rollers extended therein for the purpose of having alternate rows of loopers rotate in reverse directions at given points in the movement of the drum.

The shanks 45 of the looper hooks 44 are, as stated, rotatably mounted in the sleeves or spindles of the loopers and, as will be seen by reference to Figs. 5 and 6, said shanks are extended inwardly beyond the pinions 60 for attachment to connecting bars 71. Each of these bars is common to the shanks of a transverse series of loopers, each shank being journaled in the bar for free rotary movement and equipped with collars 72 and 73 opposed to the opposite sides of the bar 71 to compel the reciprocation of the shanks and hooks when the connecting bar is moved toward or from the axis of the drum. In order to permit the withdrawal of the shanks 45 from the connecting bars when desired, the inner collars 73 are preferably in the form of nuts screwed upon the inner ends of the shanks, as shown in Fig. 6. Extending inwardly from each bar 71, preferably adjacent to the opposite ends thereof, are arms 74, see Figs. 5, 6 and 11, provided at their inner ends with laterally extending studs 75 upon which are journaled the small anti-friction rollers 76 extending into the laterally-opening cam grooves 77 formed in the outer faces of a pair of fixed looper reciprocating cams 78 rigidly secured to the stationary drum shaft 20, as by set-screws 79 passed through the hubs of the cams, as shown. The cam grooves 77 in the cams 78 are formed as shown in Fig. 11, the outer wall of each of said grooves being cut away, as indicated at 80, to permit the insertion and withdrawal of the rollers 76 after all of the mechanism carried by a looper supporting bar has been assembled thereon. As the drum revolves around the shaft 20, the rollers 76 traveling in the cam grooves 77, will cause the connecting bar 71 to move toward and from the axis of the drum at the proper points to retract and project the hooks of the loopers in the manner required for the formation and release of the loops, as already described.

*The line wire depressing and slacking mechanism.*—From the foregoing description of the operation of the loopers it will be understood that in that portion of a line wire extending around the loop forming arc of the drum travel a number of loops are in process of formation. As it would be impractical, if not impossible, for the loopers to draw sufficient surplus wire from the spools to provide for the formation of the loops, I have devised simple and effective mechanism located adjacent to the receiving end of the active arc of the drum and arranged to perform the dual function of depressing the intermediate line wires into the line wire guides, and of effecting a local acceleration of the intermediate line wire feed for the purpose of producing sufficient slack in the intermediate line wires to provide the necessary surplus of wire for the loops. In Figs. 2, 4, 5 and 9 the mechanism referred to is clearly shown.

On the wire shaft 26 are mounted a series of line wire depressing and slack forming wheels 81 properly spaced apart by collars 82 and each located in coincidence with a circumferential series of loopers. That is to say, the wheels 81 correspond in location to a transverse series of loopers so that, in the rotation of the drum, corresponding loopers of the several transverse series will be presented in succession opposite the same wheel.

Each depressing and slacking wheel 81 is formed with a series of wire engaging teeth 83 designed as shown in Fig. 9 to extend between the looper bars or supports 35, each of which, together with each pair of line wire guides 56 formed thereon, constitute a tooth received between a pair of teeth on a wheel 81, attention being directed to the fact that the outer sides of the line wire guides 56, as well as the inner and outer corners of the teeth 83, are rounded to facilitate the intermeshing relation referred to and to avoid sharp deflections of the wires. As the teeth 83 of each wheel 81 are disposed in the plane of a circumferential series of loopers, it follows that said teeth will also be opposite the intermediate line wire $b$ directed to that series of loopers from a line wire spool. Therefore, as the drum and the several wire depressing and slacking wheels rotate in intermeshing relation and in unison, each intermediate line wire will be engaged by an ascending tooth 83 at a point between a pair of loopers occupying the second and third positions respectively, as shown in Fig. 9. Continued rotation of the drum will cause the engaged portion of the wire $b$ to be depressed toward the center of the drum for the purpose of insuring its proper location between the guides 56 of the looper in the second position so that, as the looper hook is turned, the reception of the wire within said hook will be assured. The tooth, however, does not stop at this depression of the wire to insure its engagement by the looper, but continues, as the drum rotates, to move farther in between the looper bars for the purpose of causing an acceleration of the wire feed to produce the necessary slack for the formation of the loops. As the looper now advances to the third position, a succeeding tooth 83 is brought into engagement with the wire to again accelerate the feed in the manner described. Thus, when the looper under discussion arrives in line between the axis of the wheel 81 and the drum, as shown in Fig. 9, one tooth will be moving out while the succeeding tooth is moving in, the wire being slack at both sides of the looper and held against backward movement by the looper hook which will now have been moved in or retracted so that the formation of the slack in the wire by an ascending tooth must, of necessity, be accommodated by that portion of the wire extending back to the spool. Thus, as each intermediate line wire is slacked at opposite sides of each looper, the surplus of wire required for the formation of each loop will be taken up from the slack at each side of each loop forming device during the operation thereof.

*The stay wire feeding mechanism.*—The stay wires $c$ are mounted on spools carried around with the drum and, in the present embodiment of the invention, alternating stay wires are fed across the drum from opposite ends thereof, although this is not necessary except as it may be demanded for the purpose of economizing space in making fabric with the stays comparatively close together.

Beyond each of the drum heads 32 and 33 are located an additional pair of heads 84 and 85 constituting elements of the rotary drum structure and therefore provided with hubs 86 rotatable upon the stationary shaft 20. As the heads 84 and 85 at each end of the drum are identical in construction and support similar mechanisms, only one pair and the mechanism carried thereby, will be specifically described. The peripheries of the heads 84 and 85, which are separated by a considerable interval, are connected by a series of feeder supporting frames 87, see Figs. 6, 7 and 31, each having the form of a metal plate bolted to the periphery of the outer head 84 and against the adjacent side face of the inner head 85, as shown in Fig. 6. Each frame 87 supports, in the manner to be described, a pair of stay wire feed rolls 88 and 89 between which the stay wire is fed by the rotation of the feed rolls at the proper time. The rolls 88 and 89 are provided, as in Fig. 30, with parallel spindles 90 and 91 geared together by spur gears 92 and 93, which compel the rolls to rotate in unison. The spindle 90 is mounted in a fixed bearing sleeve 94 extending inwardly from, and preferably integral with, the frame 87 and upon the inner end of the spindle is keyed or otherwise secured a beveled gear-wheel 95 meshing with a similar beveled gear-wheel 96 carried at one end of a short shaft 97 journaled in a bearing bracket 98 constituting an element of the frame 87. Upon the opposite or outer end of the shaft 97 is fixed or formed a stay wire feed pinion 99 arranged to mesh with the teeth 100 of a fixed mutilated gear-wheel 101 during a predetermined period in the travel of the drum around its axis.

Associated with the gear 101 is a locking flange 102, see Fig. 27, designed to be engaged by an arcuate locking face or cam 103 with which each pinion 99 is provided by cutting away the periphery of the pinion at one side face. During the major portion of the drum travel a given pinion 99 will be held stationary with respect to its individual rotary movement by the engagement of its locking face 103 with the locking flange 102, but at the proper time its locking face will reach the end of the flange and at the same time the pinion will be moved into engagement with the teeth of the gear. The stay wire feed will then be inaugurated for the reason that continued movement of the drum will effect the rotation of the pinion 99 by reason of the engagement of the latter with the mutilated gear, and rotary motion will thus be imparted to the feed rolls 88 and 89 until the pinion has traversed the toothed arc of the gear and has again presented its locking face to the flange 102.

In order to accommodate the feed rolls 88 and 89 to wire of any desired gage, said rolls are mounted for relative adjustment, preferably by providing the spindle 91 of the roll 89 with a laterally movable bearing sleeve 104 preferably pivoted in the frame 87, as indicated at 105 in Fig. 30, and yieldingly urged in one direction by a spring 106 carried at the inner end of an adjusting screw 107 passed through a frame bar 108. By the adjustment of the screw 107, the tension of the spring 106 may be regulated in order to cause the stay wire to be properly gripped between the feed rolls while permitting sufficient relative movement thereof to accommodate the particular gage of wire employed.

The head 84 is equipped at its outer side with a series of pairs of spool-supporting arms 109 each pair being arranged opposite one of the frames 87 and supporting a stay wire spool 110 from which the stay wire c is led to the adjacent feed rolls through an intermediate tubular guide 111 mounted in a bracket 112, bolted or otherwise secured to the frame 87. The end of the guide 111 adjacent to the rolls is tapered, as indicated at 113, see Fig. 7, to permit its location between the converging peripheries of the rolls. The longitudinal adjustment of the guide within the bracket 112 is permitted by an adjusting screw 114, which, when screwed up, secures the guide rigidly in position. As the wire c passes between the feed rolls it is received by a second guide 115 tapered in a manner similar to the guide 111 and fixed to a twister frame 116, bolted at one end to the periphery of the head 85 and rigidly secured at its opposite end to the adjacent side face of the head 32 at the periphery of the latter. From the guide 115 the stay wire passes through a coincident eye 117 in a bracket 118 rising from the twister frame 116 and from said eye the wire is fed into one end of the guide groove 57 in the outer face of the adjacent looper bar. As the drum continues to rotate, the stay wire is fed across a series of loopers and through a series of line wire loops with its free end extended beyond the margin wire remote from the feed rolls, at which time the pinion 99 moves out of mesh with the mutilated gear 101 and stops the feed.

In order that the sequence of movement of the various devices may be borne in mind, attention is directed to the fact that the feed of the stay wire is inaugurated immediately before the adjacent series of loopers reach the fifth position, see Figs. 9, 24 and 25, and continues until said loopers reach the twelfth position, after which the stay is severed and its ends twisted around the margin wires in a manner to be explained.

*The gates for closing the stay wire channel.*—When the stay wire is fed across the drum it is necessary to accurately guide the same. This is accomplished by the guide channel extending across the face of the looper bar and formed by the grooves 57, 58 and 59 in the bar 35, the looper head 42, and the hook 44, but as the outer side of this channel is open I provide a series of gates 119 having the form of metal slats or plates, disposed intermediate of the several looper hooks of the series and beyond the outside hooks, as shown in Fig. 7 of the drawings. Normally, the gates 119 are separated from the outer face of the looper bar by a considerable interval, as shown for instance in the first position in Fig. 11, but when the looper hooks are drawn back or retracted preparatory to looping the line wires, these gates are automatically closed. That is to say, when the looper hooks are drawn in at the third position, as heretofore described, the several gates 119 associated therewith are likewise drawn back to close the open outer side of those portions of the stay wire channel lying at opposite sides of the hooks. The gates remain closed during the formation of the line wire loops and the feeding of the stay wire across the drum so as to guard against a possible outward deflection of the advancing end of the stay wire from its channel. When, however, the looper hooks are moved out to release the stay from the channel, the gates are likewise moved out or opened so as to permit such lateral withdrawal of the stay. This outward movement of the gates occurs approximately in the thirteenth position of the series of loopers associated therewith and from this point around to the third position again the gates remain open. In other words, the gates 119 associated with each series of looper hooks are designed to move in and out with the hooks. This end is attained by mounting each gate 119 on a stem 120 extended inwardly through the looper bar 35 and connected in any suitable manner to the bar 71 associated with the adjacent set of hooks. The manner in which these stems 120 are connected to the bar 71 is immaterial the stems of the end gates being preferably bolted to the arms 74, and the remaining gates being secured directly to the bar by clamps 121, as shown in Fig. 5.

*The stay wire cutting and deflecting mechanism.*—When a stay wire is fed across the drum a sufficient distance to form a stay, it is necessary to sever the stay from the wire and to deflect the ends of the stay laterally in order that they may be engaged and twisted around the margin wires without interference between the stay wire and the twisters during the operation of the latter. I therefore equip each twister frame 116 with a swinging plate 122, certain of which constitute stay wire cutters and deflectors since they sever the stay and deflect the end thereof into engagement with the adjacent twister, and certain others of which merely constitute deflectors since they operate upon the free end of the stay wire and only deflect the same. This swinging plate 122 is mounted to oscillate upon the enlarged cylindrical end 123 of a stud shaft 124 passed through an opening 125 in the bracket 118 and having screwed upon its rear end a nut 126 by means of which the shoulder formed by the enlargement 123 of the shaft may be drawn close against the inner vertical face of the bracket. See Fig. 6. In this figure the cutter and deflector 122 is shown interposed between the bracket 118 and a washer 127 of fibrous or other suitable material. The shaft 124 is located above the eye 117 in the bracket 118 so that the stay wire, extending through said eye and beyond the inner side of the bracket, will be disposed in eccentric relation to the cutting and deflecting plate 122, which latter is formed, as shown in Fig. 32, with a pendent cutting and deflecting lug 128 having a radial face 129 which normally lies beyond one side of the stay wire. At the proper time the plate 122 is swung to the dotted position in Fig. 32, causing the lug 128 to move across the plane of the stay wire, thus severing the same and simultaneously forcing the severed end of the stay in a lateral direction, as shown in Fig. 7, for engagement with a stay wire twister.

In order to facilitate the cutting operation, a steel bushing 130 is preferably set into the bracket 118 immediately adjacent to the cutter and constituting a continuation of the eye 117 for the stay wire. While these cutting and deflecting plates 122 might be operated in a variety of ways, I prefer to pivotally connect each plate with a tappet 131 disposed radially with respect to the drum and provided with a stem 132, which, when the tappet is urged inward to swing the plate, will be received within a suitable socket 133, as shown in Fig. 32. As the drum rotates to carry a given series of line wire loopers from the twelfth to the thirteenth position, see Fig. 4, the tappets 131 of the adjacent plates 122 will move into engagement with a pair of fixed cutter operating cams 134, preferably carried by and pendent from the head beam 25, as shown in Figs. 4, 5 and 34. As the drum continues to rotate, the rounded upper ends of the tappets 131 will travel along the under faces 135 of the cams 134 and said tappets will thus be moved inward to swing the plates 122 for the purpose of effecting the cutting of the stay from the stay wire and for the further purpose of deflecting the ends of the stay into operative relation to the stay wire twisters, to be described. After the tappets have cleared the cams, the plates 122 may be restored to their normal positions by any suitable means, as for instance, retracting springs, but as it is desired to dispense with all reactive parts and to secure the positive operation of every element of the machine, I prefer to provide each of the cutter operating cams 134 with a small retracting cam 136, see Fig. 34, disposed to be engaged by tail pieces 137 formed on the plates 122 at their rear ends, see Fig. 32. Thus, as the drum revolves, the tappets engage the cams 134 to swing the plates 122 and the tail pieces 137 subsequently engage the retracting cams 136 for the purpose of restoring the plates to their normal positions.

*The stay wire twisting mechanism.*—Having seen how the line wire loops are formed, how the stay wires are fed across the drum and through coincident loops, and how the stays are severed from the stay wires and deflected at their ends, we will now proceed to the construction of the stay wire twisters which engage these deflected ends of the stays and twist them around the margin wires of the fabric.

As heretofore stated, the margin wires $a$ after being crimped by the crimping rolls 13 and 14 are passed around the upper side of the weaving drum, as clearly shown in Fig. 4, which latter is equipped with two circumferential series of margin wire guides 138. These guides for the margin wires are preferably in the form of paired lugs 139 and 140 extending outwardly from each twister frame 116 and located immediately beyond the outer sides of the heads 32 and 33, see Figs. 6, 7 and 32, it being understood that each set or transverse series of line wire loopers is interposed between a pair of twister frames extending, as already stated, between the heads 85 and the adjacent heads 32 or 33, as the case may be.

Each pair of lugs 139 and 140 of the margin wire guides are provided with outwardly opening throats 141 leading into coincident circular openings 142 provided in the lugs for the reception of a rotary stay wire twister 143, see Figs. 7, 32 and 33. As shown in Figs. 6, 32 and 33, each twister 143 is of cylindrical form and is provided midway of its ends with a spiral pinion 144 located between the lugs 139 and 140, see Fig. 7, and at one end of the twister is secured a detachable face plate 145 from which projects the twister hook 146. Obviously, the hook 146 and the face plate will receive most of the wear incidental to the twisting of the stay wire and it is for this reason that the plate is made detachable in order to facilitate replacement of the parts when worn.

In one side of the twister, and extending the entire length thereof, is formed a radial slot 147 opening into a central bore 148 provided in the twister for the reception of a relatively fixed center guide 149 provided for the reception of the margin wire and having a radially disposed longitudinal opening 150 constituting an axial seat for the reception of the margin wire. The center guide 149, constructed substantially as shown in Fig. 36, extends entirely through the twister longitudinally, and beyond the rear end thereof is provided with an attaching plate 151 which rests upon the upper surface of the twister frame 116, as shown in Fig. 33, and is screwed or otherwise secured to the lug 139. Normally, each twister occupies the position shown in Figs. 32 and 33, the opening 147 therein being coincident with the throat 141 of the margin wire guides and also with the slot or seat 150 in the center guide 149. It will therefore appear that the margin wires carried up and around the drum will enter the guides and passing through the openings in the twister, will be seated within the fixed center guides 149 so as to occupy positions at the axes of the twisters, as shown in Fig. 6. It will thus be seen that when a given set or series of loopers reaches the twelfth position the margin wires will be disposed across the stay wires, as shown in Figs. 7 and 32, with the adjacent twister hooks located slightly above the horizontal at the inner sides of the twisters, as shown in Figs. 6 and 7. Now, as the drum continues to rotate to advance the particular weaving set under consideration to the thirteenth position, the stay wire cutting and deflecting plates 122 will be operated in the manner heretofore explained to sever the stay and to deflect the ends of the same into close proximity to the outer sides or edges of the front ends of the twisters, as shown in Fig. 7, it being understood that the twisters are set back from the normal plane of the stay wire a sufficient distance to enable the twister hooks to revolve around the line wires during the twisting operation without contacting with that portion of the stay which extends between the line wires.

During that period of the drum travel occupied by the cutting and deflecting of the stay wire, the adjacent twisters will be rotated so that the twister hooks will travel from the inner sides of the twisters to the outer sides thereof for the purpose of engaging the ends of the stay immediately after the latter have been deflected into the paths of the hooks. After engaging the ends of the stay, the hooks will continue to travel around the margin wires until each end of the stay has made substantially two and one-half turns or complete twists around the line wire and points inward, being located substantially in the plane of the fabric, at which time this particular weaving set will have completed its function and all of the parts thereof will be in their initial positions for a repetition of the described operations during a succeeding rotation of the drum. It will be understood, however, that the outward movement of the several looping hooks will occur at the thirteenth position immediately after the twister hooks have engaged the ends of the stay and begun their travel around the line wire, ample time for the complete operation of twisting the stay being afforded during the travel of this particular weaving set from the thirteenth to the seventeenth positions, at which latter point the completed fabric is delivered from the drum.

The mechanism for operating the twisters is similar to that employed to drive the stay wire feed rolls. The spiral pinions 144 of the circumferential series of twisters are meshed with similar pinions 152 mounted on short shafts 153 journaled in inwardly extending portions 154 of the twister frames 116, see Figs. 6 and 32, and upon each shaft is fixed a twister operating pinion 155. The several pinions 155 of each series are arranged to mesh with the teeth 156 of a fixed mutilated gear 157 secured to the stationary shaft 20 and provided with an arcuate locking flange 158 terminating at the opposite ends of the series of teeth 156 and arranged to engage locking faces or cams 159 formed by cutting away the peripheries of the pinions 155 adjacent to their outer edges. During the major portion of the travel of each pinion 155, it is held stationary by the engagement of its face 159 with the locking flange 158, but just after the weaving set, of which said pinion constitutes an element, passes the twelfth position, said pinion moves out of engagement with the locking flange and into engagement with the teeth 156. The pinion thus rotates to operate its twisters, and after the latter has made three complete rotations to effect the attachment of one end of the stay to the margin wire, the pinion will move out of engagement with the teeth and into engagement with the locking flange to hold the twister stationary until it is again called into action for the attachment of a succeeding stay.

The foregoing constitutes a complete description of the weaving drum and its complementary devices, with the exception of the feed drum and the associated parts for operating the drum and for winding the completed fabric on the reel.

*The feed drum.*—The feed drum 6 is that element of the machine which exerts sufficient pull on the fabric to effect the operation of the weaving mechanism, the withdrawal of the fabric from the drum and the completion of the fabric by drawing out the loops in the intermediate line wires and thus intertwisting said wires and the stays at their points of intersection. The drum 6 has still another function, however, to-wit the slight crimping of the intermediate line wires between the stays, this crimping being desirable since it permits more or less give in the fabric when the latter is subjected to longitudinal strain in stretching up the same. To the attainment of these several ends the drum 6 is equipped with several circumferential series of groups of fabric engaging pins 159ª, said series corresponding in number with the line and margin wires of the fabric and the groups of the series being so distributed as to engage the wires at points between the stays, see Figs. 4 and 38. The pins 159ª are outwardly tapered, as shown, and the members of each group are arranged in staggered relation, Fig. 1, so that they will be disposed alternately at opposite sides of the wire engaged thereby. By this arrangement, while the line wire passes freely between the outer ends of the pins constituting a group, the enlargement of the bases of the pins and the consequent opposite inclination of their wire engaging edges will cause the wire to be bent or crimped as it is drawn down against the periphery of the drum during the rotation of the latter. It will appear, furthermore, that this crimping of the wires, while constituting a desirable feature of the fabric, is also of practical importance in the successful operation of the machine, since a close gripping engagement between the pins and the wires is thus effected, and, as a consequence, the fabric will not slip around the drum when sufficient power is applied to the latter to draw out the loops and intertwist the line and stay wires and to operate the weaving mechanism by the pull exerted on the fabric.

In order to secure an extensive engagement between the fabric and the feed drum 6, said fabric, after passing around the major portion of the drum, is carried in the opposite direction around the tension drum 7 and thence to the reel 8, of ordinary construction. The power is applied from a power shaft 160 equipped with a band-wheel 161 and with a gear wheel 162 meshing with a comparatively large similar gear-wheel 163 fixed to the shaft 164 of the feed drum 6. The wheel 163 is in mesh with a somewhat smaller spur-gear 165 fixed to the shaft 166 of the tension drum 7, the opposite end of said shaft being geared, as by sprockets 167 and 168 and a chain 169, to the reel shaft 170, a friction clutch 171 being interposed between the sprocket 168 and the reel shaft in order to permit the slipping of the reel as the peripheral speed of the accumulated roll of fabric increases.

Since the operation of the machine has been explained in detail during the course of the preceding description, reiteration at this point is deemed to be unnecessary. It should be understood, however, that many of the mechanisms and instrumentalities constituting parts or features of the illustrated machine possess novel characteristics which adapt them for use in relations other than those specified. Furthermore, the invention in several aspects thereof comprehends modifications or variations of the recited structure. For instance, the specified mechanisms constituting a weaving set may vary within wide limits without departing from the idea of a traveling weaving set arranged to be advanced with continuously moving line wires to effect the connection of the same in transit to form the fabric. It may also be desirable to drive the weaving drum by the application of power either auxiliary to or entirely independent of the pull on the fabric, this variation coming clearly within the scope of the invention in the broader aspects thereof.

Before concluding, attention is directed to the fact that the word "traveling", employed in the claims to distinguish applicant's loopers from similar devices heretofore utilized in this particular art, is not intended to include those movements of the looper elements which are merely incidental to the formation of a loop, but, on the contrary, is intended to define a looper which not only operates to form a loop, but also has a definite bodily travel. It may also be stated that where the term "interlocking" is employed in the claims to define the manner in which the line and stay wires are connected, it is not intended to include the welding of the wires together, nor the connection of the wires by separate fastening devices, as for instance, buckles or the like, but is intended to include any direct mechanical connection effected by distorting, coiling, or twisting one or more of the wires connected. Also when the stay wire feeding means is stated to be located outside of the series of line wires, the term "outside" is intended to distinguish the applicant's arrangement from stay feeding devices which travel across the series of line wires.

In view of these considerations, it should be distinctly understood that while the illustrated embodiment of the invention is thought at this time to be preferable, I reserve the right to effect such changes, modifications and variations of the illustrated structure as may come fairly within the scope of the protection prayed.

What I claim is:—

1. In combination, a hollow drum, wire connecting mechanism exposed on the exterior thereof, and operating mechanism located within the hollow drum and arranged to operate the wire connecting mechanism.

2. In combination, a stationary shaft, a hollow rotary drum having heads journaled on the shaft, wire connecting mechanism exposed upon the periphery of the drum and movable with the latter, and stationary operating mechanism mounted upon the fixed shaft and within the hollow drum to operate the wire connecting mechanism as the drum is rotated.

3. In a machine for making wire fabric, wire connecting mechanism movable in an endless orbit and including a series of connecting devices extending across the width of the fabric, means for feeding a plurality of wires to the connecting devices, and means inclosed within the orbit of movement of the wire connecting mechanism to operate the same during the orbital travel.

4. In a machine for making wire fabric, the combination with wire connecting mechanism traveling in an endless orbit, of means for continuously feeding a plurality of margin wires and intermediate line wires, means for feeding stays across the margin wires and line wires, and stationary operating mechanism inclosed by the orbit of movement of the wire connecting mechanism and arranged to operate the same to connect the stays to the moving wires.

5. In combination, a hollow rotary drum, wire connecting mechanism mounted thereon and movable therewith, means for feeding a plurality of wires to said mechanism, and operating mechanism completely housed within the drum and arranged to operate the wire connecting mechanism to effect the connection of the wires during the travel of the wire connecting mechanism.

6. In combination, a rotary drum, wire connecting mechanism mounted thereon and including line wire loopers, and means mounted in the drum for operating said loopers.

7. In combination, a rotary drum, wire connecting mechanism mounted thereon and including loopers and twisters, and stationary operating devices for the wire connecting mechanism.

8. In combination, a rotary drum, wire connecting mechanism mounted thereon and including devices for connecting stays to margin wires and intermediate line wires, and stationary cams located within the drum and operatively related to the wire connecting mechanism to operate the same as the drum rotates.

9. In combination, means for continuously advancing a plurality of line wires, means operating during the movement of the line wires to advance a stay wire across the same, and mechanism moving with the line wires in the direction of feed thereof and operating during such movement to interlock the stay wire with the several line wires with certain of the line wires coiled upon the stay wire and with the stay wire coiled upon certain of the line wires.

10. In combination, a rotary drum, wire connecting mechanism mounted thereon and including devices for connecting stays to the margin wires and to intermediate line wires, means for causing a plurality of wires to move with the drum, and fixed cams located within the drum and operatively related to the wire connecting mechanism to actuate the same as the drum rotates and to thereby effect the connection of the wires in transit.

11. In combination, means for continuously advancing a plurality of line wires, means for advancing a stay wire across the line wires during the advance of the latter, and wire connecting mechanism movable with the line wires in the direction of the feed thereof and operating during such movement to effect interlocking of the line and stay wires at their points of intersection, the interlocking engagement at each point of intersection being produced by a portion of one wire surrounding the other.

12. In combination, a stationary axial support, a drum rotatable thereon, wire connecting mechanism mounted on the drum, means for causing a plurality of wires to move with the drum, and operating mechanism including a cam mounted on the axial drum support and operatively related to the wire connecting mechanism.

13. In a machine for making wire fabric, the combination with a support, of wire connecting mechanism mounted to travel on the support and arranged to connect a plurality of continuously moving line wires and a stay wire, with certain of the line wires looped around the stay wire and with the stay wire coiled around the margin wires.

14. In a machine for making wire fabric from stay wires and a plurality of continuously advancing line wires, mechanism movable with the line wires in the direction of feed thereof and operating during such movement to cause the interweaving of the stay wires with the intermediate line wires and the coiling of the stay wires upon the margin wires.

15. In a machine for making wire fabric, a support and traveling wire connecting mechanism including a looper and a twister.

16. In a machine for making wire fabric, the combination with a moving support, of connecting means mounted thereon and including a looper and a twister arranged to effect the looping and twisting of different wires.

17. In a machine for making wire fabric, a support and a plurality of loopers arranged upon the support in position to form a plurality of loops in the same wire.

18. In a machine for making wire fabric, the combination with guiding means for a line wire, of a plurality of loopers associated with the guiding means, and means for operating the loopers to form a plurality of loops in the same line wire.

19. In a machine for making wire fabric, the combination with a rotary drum, of wire connecting mechanism mounted thereon, means for continuously feeding a plurality of margin wires and intermediate line wires in operative proximity to the wire connecting mechanism, means for feeding stays across the moving wires, and stationary cams located within the drum and operatively related to the wire connecting mechanism to operate the same during the movement of the wires to connect the stays to said wires.

20. In combination, wire connecting mechanism and means for operating the same through the medium of the wire.

21. In combination, wire connecting mechanism, means for presenting a plurality of wires thereto, and means for exerting a pull on one or more of said wires to effect the operation of the wire connecting mechanism.

22. In combination, traveling wire connecting mechanism, means for causing a plurality of wires to move therewith, and means operating through the medium of one or more of said wires to actuate the wire connecting mechanism and thus connect the wires in transit.

23. In combination, wire connecting mechanism movable in an endless orbit, means for causing a plurality of wires to move in operative proximity to said mechanism to effect the travel of said mechanism in its orbit and to operate said wire connecting mechanism to connect the wires in transit.

24. In combination, wire connecting mechanism movable around an axis, means for presenting a plurality of wires to said mechanism, and means for exerting a longitudinal strain on certain of said wires to revolve the wire connecting mechanism around its axis and to cause said mechanism to connect the wires in transit.

25. In combination, a rotary drum, wire connecting mechanism mounted thereon, means for guiding a plurality of wires to the wire connecting mechanism, and means for operating the drum and the wire connecting mechanism through the medium of one or more of the wires.

26. In a machine for making wire fabric, weaving mechanism arranged to be operated by a pull on the completed fabric whereby the manufacture of the fabric will be automatically and continuously effected by the withdrawal of the completed fabric from the weaving mechanism.

27. In a machine for making wire fabric by connecting line and stay wires, the combination with wire connecting mechanism, of means whereby said mechanism will be operated by a pull upon the line wires to effect the connection of the line and stay wires of the fabric.

28. In a machine for making wire fabric, the combination with means for drawing a plurality of line wires through the machine, of means operated by the pull on the line wires for effecting the application of a stay thereto.

29. In a machine for making wire fabric, the combination with means for drawing a series of line wires through the machine, of means operated by the pull on the line wires for effecting, during the transit thereof, the successive application of stays thereto.

30. In a machine for making wire fabric, the combination with means for continuously advancing a series of line wires, means for moving a stay wire with the line wires, means for interweaving a stay wire with the line wires during the advance of the latter, and means for severing the stay wire.

31. In a machine for making wire fabric, the combination with means for continuously advancing a plurality of line wires, of means mounted to travel with the line wires and operating during such travel to interweave a stay with the line wires and to thereafter coil the ends of the stay upon the margin wires.

32. In a machine for making wire fabric, the combination with means for continuously advancing a plurality of line wires, of means for moving a plurality of stay wires with the line wires, and means for feeding the stay wires across the line wires by an uninterrupted motion, said means operating to cause several of the stay wires to be moving at the same time in the act of crossing the line wires.

33. In a machine for making wire fabric, the combination with means for continuously advancing a plurality of line wires, of a plurality of stay wire holders movable with the line wires, means for looping the line wires, and means for causing the stay wires to be passed through the line wire loops.

34. In a machine for making wire fabric, the combination with means for continuously advancing a plurality of line wires, of means for forming loops in certain of the line wires during the movement thereof, and means for applying stays to the line wires.

35. In a machine for making wire fabric, the combination with a weaving set movable in an endless orbit, of means for feeding a plurality of line wires to present successive portions thereof to the weaving set, said weaving set including means for automatically supplying successive stays thereto and means for applying said stays to the line wires in transit.

36. In a machine for making wire fabric, the combination with means for continuously advancing a series of line wires, of a series of stay feeding devices each movable in an endless orbit and arranged to project a stay across the several line wires, and other means for twisting the stay upon certain of the line wires.

37. In a machine for making wire fabric, the combination with a rotary drum and means for feeding a plurality of line wires in operative relation with the drum, of means carried by the drum for disposing successive stays across the line wires, and means also carried by the drum for causing the interweaving of the stays and line wires.

38. A machine for connecting angularly related wires, including means for feeding a wire longitudinally, and means for looping said wire during the longitudinal movement.

39. A machine for connecting angularly related wires, including means for feeding a wire longitudinally, and simultaneously operating devices for forming a plurality of loops in said wire in transit.

40. In a machine for connecting angularly related wires, the combination with means for feeding a wire longitudinally, of means for looping said wire during the movement thereof, and means for passing a second wire through the loop.

41. In a machine for connecting angularly related wires, the combination with means for looping one wire during its longitudinal movement, of means for passing another wire through the loop, and means for drawing up the loop to effect the engagement of the wires.

42. In a machine for connecting angularly related wires, the combination with traveling looping means arranged to loop a wire in transit, of means mounted to travel with the looping means for feeding a second wire through the loop.

43. In a machine for making wire fabric, the combination with means for looping a plurality of moving wires, of means for feeding a connecting wire through the loops.

44. In a machine for making wire fabric, the combination with means for feeding a plurality of line wires, of means for simultaneously looping said wires in transit, and means for feeding a stay through said loops during the continued transit of the line wires.

45. In a machine for making wire fabric, the combination with a series of traveling line wire loopers, of stay wire feeding mechanism associated therewith.

46. In a machine for making wire fabric, the combination with a series of traveling line wire loopers, of a stay wire feeder movable with the loopers.

47. In a machine for making wire fabric, the combination with a support, of a line wire looper traveling in an endless orbit.

48. In a machine for making wire fabric, the combination with a support, of a series of sets of line wire loopers mounted to travel in unison.

49. In a machine for making wire fabric, the combination with a series of sets of line wire loopers, of means for bringing the several sets of loopers into operation in succession.

50. In a machine for making wire fabric, the combination with a series of sets of line wire loopers, of means for causing the simultaneous operation of the several loopers of a set and for bringing the sets into action in succession.

51. In a machine for making wire fabric, the combination with a series of sets of line wire loopers traveling in unison, of means for causing the simultaneous operation of the several loopers of a set and for bringing the sets into action in succession.

52. In a machine of the class described, the combination with a plurality of line wire loopers, of means for bringing said loopers into operation in succession.

53. In a machine of the class described, the combination with means for feeding a line wire, of a plurality of line wire loopers operating in succession to loop the line wire at different points during the transit of said wire.

54. In a machine for making wire fabric, the combination with a rotary drum, of a line wire looper movable with said drum.

55. In a machine for making wire fabric, the combination with a rotary drum, of a plurality of simultaneously operating line wire loopers movable with the drum.

56. In a machine for making wire fabric, the combination with a rotary drum, of successively operating line wire loopers movable with the drum.

57. In a machine for making wire fabric, the combination with a rotary drum, of a series of sets of line wire loopers movable with the drum.

58. In a machine for making wire fabric, the combination with a rotary drum, of a series of sets of line wire loopers movable with the drum, and means for bringing the several sets of loopers into operation in succession.

59. In a machine for making wire fabric, the combination with a rotary drum, of a circumferential series of line wire loopers carried by the drum, and means for disposing a line wire in position to be successively engaged by said loopers.

60. In a machine for making wire fabric, the combination with a rotary drum, of several circumferential series of line wire loopers movable with the drum, and means for disposing a separate line wire in position to be engaged by the several loopers of each series.

61. In a machine for making wire fabric, the combination with a rotary drum, of a line wire looper and an associated stay feeder movable with the drum.

62. In a machine for making wire fabric, the combination with a rotary drum, of a plurality of line wire loopers movable with the drum, means for directing a line wire in position to be successively engaged by the loopers, and means for feeding stays through the loops in the line wire.

63. In a machine for making wire fabric, the combination with a rotary drum, of a series of sets of line wire loopers movable with the drum, and a separate stay feeder associated with each set of loopers.

64. In a machine for making wire fabric, the combination with means for continuously advancing a plurality of line wires, of means mounted to travel with the line wires and operating during such travel to interweave a stay wire with the several line wires, and means for severing the stay wire.

65. In a machine for making wire fabric, the combination with a traveling line wire looper, of stay wire feeding and cutting mechanism associated therewith.

66. In a machine for making wire fabric, the combination with a series of line wire loopers mounted to travel in unison and to operate in succession, of stay wire feeding and cutting mechanism associated with said loopers.

67. In a machine for making wire fabric, the combination with a plurality of sets of line wire loopers, of separate stay wire feeding and cutting mechanism associated with each set.

68. In a machine for making wire fabric, the combination with a plurality of separate sets of line wire loopers mounted to travel in unison, of separate stay wire feeding and cutting mechanism associated with each set of loopers.

69. In a machine for making wire fabric, the combination with a line wire looper mounted to travel in an endless orbit, of stay wire feeding and cutting mechanism associated with the looper.

70. In a machine for making wire fabric, the combination with a rotary drum, of a line wire looper, a stay wire feeder, and a stay wire cutter, all mounted on the drum for movement in unison.

71. In a machine for making wire fabric, the combination with a rotary drum, of a peripheral series of line wire loopers mounted thereon, means for guiding a line wire to said loopers, and separate stay wire feeding and cutting mechanism for each looper.

72. In a machine for making wire fabric, the combination with a rotary drum, of several sets of line wire loopers arranged progressively around the periphery of the drum, and stay wire feeding and cutting means.

73. In a machine for making wire fabric, the combination with a rotary drum, of several sets of line wire loopers arranged around the periphery of the drum, and separate stay wire feeding and cutting mechanism associated with each set of loopers and movable with the drum.

74. In a machine for making wire fabric, the combination with means for advancing a plurality of line wires, of means operating during the advance of the line wires to interweave a stay wire with certain line wires, and a plurality of twisters for twisting different portions of the stay wire around different line wires.

75. In a machine for making wire fabric, the combination with means for continuously advancing a plurality of intermediate line wires and margin wires, of means operating during the advance of the said wires for interweaving a stay wire with the intermediate line wires, and a plurality of twisters operating after the said stay wire has been interwoven with the line wires to twist the opposite ends of the stay around the margin wires.

76. In a machine for making wire fabric, the combination with means for continuously advancing a plurality of line wires, of means for looping certain of said wires, means for passing a stay through said loops, and means movable with the line wires in the direction of the feed thereof to twist the stay around a plurality of line wires simultaneously.

77. In a machine for making wire fabric, the combination with means for advancing a series of line wires, of means for feeding a stay across the series of line wires by a continuous movement, and means for thereafter twisting the stay upon a line wire during the advance of the latter.

78. In a machine for making wire fabric, the combination with means for advancing a plurality of line wires, of means for continuously feeding a stay across the entire series of line wires during the advance of the latter, and means for twisting the ends of the stay upon certain of said line wires during the transit thereof.

79. In a machine for making wire fabric, the combination with means for continuously advancing a series of line wires, means for feeding a stay wire across the line wires during the advance of the latter, means for severing the stay wire, and means operating subsequent to the severance of the stay wire and during the advance of the line wires to twist the opposite ends of the stay around the outside line wires of the series.

80. In a machine for making wire fabric, the combination with a moving support, of a line wire supported by and movable with the support, a stay wire twister mounted on said support and arranged to twist a stay around the line wire during the movement of the latter, and means for looping another line wire to facilitate the application of the stay thereto.

81. In a machine for making wire fabric, the combination with a rotary support, of line wire looping means, and stay wire twisting means mounted on and movable with the support.

82. In a machine for making wire fabric, the combination with a rotary drum, of line wire looping means and stay wire twisting means mounted on and movable with the support, said line wire looping means being arranged to loop a plurality of line wires simultaneously.

83. In a machine for making wire fabric, the combination with a rotary support, of means for advancing a series of line wires, means for feeding stays across the series of line wires, and mechanism for connecting the stays and line wires, said mechanism including a twister mounted on and movable with the support and adapted to twist a stay upon a line wire.

84. In a machine for making wire fabric, the combination with a rotary support, of means for guiding a series of line wires over the support, means for feeding stays across the line wires, and wire connecting mechanism including a circumferential series of twisters carried by the rotary support and moving in the same plane to connect successive stays to a line wire.

85. In a machine for making wire fabric, the combination with a rotary support, guiding means thereon for a series of line wires, other guiding means on the support for stays, means for advancing stays across the series of line wires, and a series of twisters extending around the support and adapted to successively engage a line wire and to twist successively stays thereon.

86. In a machine for making wire fabric, the combination with a rotary drum and a plurality of circumferential series of twisters mounted on the drum, means for simultaneously operating corresponding twisters of said series, and means mounted on and movable with the drum for feeding each stay to a pair of twisters.

87. In a machine for making wire fabric, the combination with a rotary drum, of two circumferential series of twisters mounted on the drum, means for guiding a line wire to each series of twisters, and means for guiding a stay to corresponding twisters of both series to be twisted thereby upon both line wires.

88. In a machine for making wire fabric, the combination with means for advancing a plurality of line wires, of means for forming loops in certain of said wires during their advance movement, means for passing a stay through the loops of the looped wires, and means for twisting the stay around a line wire.

89. In a machine for making wire fabric, the combination with means for advancing margin and intermediate line wires, of means for looping the intermediate line wires during the movement thereof, means for passing a stay through the loops, and means for twisting the opposite ends of the stay around the margin wires.

90. In a machine for making wire fabric, the combination with a support, of line wire looping means, and stay wire twisting means, mounted to travel in unison.

91. In a machine for making wire fabric, the combination with a support, of line wire looping means and stay wire twisting means movable in an endless orbit.

92. In a machine for making wire fabric, the combination with a rotary drum, of line wire looping mechanism and stay wire twisting mechanism mounted on and movable with the drum.

93. In a machine for making wire fabric, the combination with a traveling set of line wire loopers, of a stay wire twister associated therewith.

94. In a machine for making wire fabric, the combination with a traveling set of line wire loopers, of stay wire twisters located at opposite ends of said set.

95. In a machine for making wire fabric, the combination with a support, of a traveling weaving set, including wire looping, twisting and feeding means.

96. In a machine for making wire fabric, the combination with a support, of a traveling weaving set, including a line wire looper, a stay wire feeder, and a twister for twisting a stay around a margin wire.

97. In a machine for making wire fabric, the combination with a support, of a traveling weaving set, including a plurality of line wire loopers, a plurality of stay wire twisters, and means for feeding a stay across the set.

98. In a machine for making wire fabric, the combination with a support, of a traveling weaving set, including a pair of twisters, a series of line wire loopers located between the twisters, means for guiding margin wires to the twisters and intermediate line wires to the loopers, and means for feeding a stay across the weaving set and through the loops in the intermediate line wires with the opposite ends of said stay in position to be engaged by the twisters.

99. In a machine for making wire fabric, the combination with a support, of a traveling weaving set, including a line wire looper and stay wire feeding and cutting means.

100. In a machine for making wire fabric, the combination with a support, of a traveling weaving set, including line wire looping means, stay wire feeding means, wire cutting means, and a stay wire twister.

101. In a machine for making wire fabric, the combination with a support, of a traveling weaving set, including line wire loopers, a stay wire feeder, a stay wire cutter, and stay wire twisters.

102. In a machine for making wire fabric, the combination with a support, of a traveling weaving set, including a plurality of line wire loopers, a stay wire holder, means for feeding the stay wire across the set from the holder, means for cutting the stay from the wire, and twisters for twisting the opposite ends of the stay around margin wires.

103. In a machine for making wire fabric, the combination with means for advancing a plurality of line wires and a margin wire, of a twister movable with the margin wire, means for feeding a stay across the line wires in transit, and means for deflecting the stay into operative relation with the twister.

104. In a machine for making wire fabric, the combination with means for advancing a series of line wires and a margin wire, of a twister associated with the margin wire, means for advancing a stay wire across the series of line wires in transit, and means for cutting a stay from the stay wire and for deflecting the end of said stay into operative relation with the twister.

105. In a machine for making wire fabric, a traveling weaving set, including line wire looping means, stay twisting means, a stay feeder, and means for laterally deflecting the stay into operative relation with the twister.

106. In a machine for making wire fabric, the combination with a rotary support, of a plurality of weaving sets movable therewith, each of said sets including line wire looping means and stay feeding means.

107. In a machine for making wire fabric, a series of weaving sets movable in an endless orbit and each including line wire looping means and stay feeding means.

108. In a machine for making wire fabric, a series of weaving sets movable in an endless orbit and each including line wire looping means, stay feeding means, and stay twisting means.

109. In a machine for making wire fabric, a series of weaving sets movable in an endless orbit and each including a plurality of line wire loopers and a stay wire twister.

110. In a machine for making wire fabric, a series of weaving sets movable in an endless orbit and each including a plurality of line wire loopers, twisters at opposite sides of the loopers, and means for feeding stays across the sets.

111. In a machine for making wire fabric, a plurality of weaving sets movable in an endless orbit and each including a pair of stay twisters, a plurality of line wire loopers located between the twisters, a stay wire holder, means for feeding a stay wire from said holder across the set of loopers and twisters, means for severing a stay from the stay wire, and means for laterally deflecting the ends of the stay into engagement with the twisters.

112. In a machine for making wire fabric, the combination with a rotary support, of a series of weaving sets arranged about the periphery of the support, each set including a plurality of devices for connecting line wires and stays, and a stay wire guide extending between the wire connecting devices to guide a stay from one device to another.

113. In a machine for making wire fabric, the combination with a rotary support, of a series of weaving sets carried thereby and each including a plurality of wire connecting devices for connecting line wires and stays, and a stay wire guide, each set being detachable as a whole from the support.

114. In a machine for making wire fabric, the combination with a rotary drum, of a plurality of detachable looper bars carried thereby, and a series of loopers mounted in each bar.

115. In a machine for making wire fabric, the combination with means for continuously advancing a series of line wires, means for advancing a stay across the line wires, twisters for twisting the stay around the outside line wires, an open-sided channel extending between the twisters to guide the stay, and a movable gate closing the open side of the channel.

116. In a machine for making wire fabric, the combination with means for advancing a series of line wires, of means for advancing a stay across the line wires in transit, an open-sided channel through which the stay is guided in its movement, a gate disposed to guard the open side of the channel, and means for opening and closing the gate at the proper time.

117. In a machine for making wire fabric, the combination with means for advancing a series of line wires, of loopers movable with the wires to loop the same in transit, means for feeding a stay through the loops of the line wires, an open-sided channel through which the stay is guided in its movement, a gate guarding the open side of said channel, and means for moving the gate to close the channel during the feeding of the stay and to open the side of the channel for the purpose of permitting the withdrawal of the stay at the proper time.

118. In a machine for making wire fabric, the combination with a traveling looper, a stay guiding channel associated therewith, a gate arranged to guard the channel and movable toward and from the same, and an operating device common to the gate and looper.

119. In a machine for making wire fabric, the combination with a traveling looper, a stay guiding channel associated therewith, a gate arranged to guard the channel and movable toward and from the same, and an operating cam common to the gate and looper.

120. In a machine for making wire fabric, the combination with a series of line wire loopers mounted to travel in unison to form successive loops in the moving line wire, of a series of stay wire channels for guiding stays through the loops in the line wire, a movable gate guarding each channel, and means for operating each looper and its associated gate in order.

121. In a machine for making wire fabric, the combination with a series of traveling loopers, of stay channels associated with the loopers, movable gates disposed to guard the channels, and operating mechanism common to the loopers and gates.

122. In a machine for making wire fabric, the combination with a rotary drum, of a series of sets of line wire loopers distributed around the periphery of the drum, open-sided stay channels through which stays are guided to the loopers, and movable gates guarding said channels.

123. In a machine for making wire fabric, the combination with a rotary drum, of a series of sets of line wire loopers distributed around the periphery of the drum, open-sided stay channels through which stays are guided to the loopers, movable gates guarding said channels, and operating mechanism common to all the gates.

124. In a machine for making wire fabric, the combination with a rotary drum, of a series of sets of line wire loopers distributed around the periphery of the drum, open-sided stay channels through which stays are guided to the loopers, movable gates guarding said channels, and a fixed operating cam common to the several gates.

125. In a machine for making wire fabric, the combination with a rotary drum, of a series of sets of line wire loopers distributed around the periphery of the drum, open-sided stay channels through which stays are guided to the loopers, movable gates guarding said channels, and gate operating means located within the drum.

126. In a machine for making wire fabric, the combination with a rotary drum, of a series of sets of line wire loopers distributed around the periphery of the drum, open-sided stay channels through which stays are guided to the loopers, movable gates guarding said channels, and a fixed gate operating cam inclosed within the drum and common to all the gates.

127. In a machine for making wire fabric, the combination with a looper bar provided with a stay channel in its face, a series of loopers mounted in the bar, a series of movable gates guarding the channel, stems extending through the bar from the gates, and means for reciprocating said stems.

128. In a machine for making wire fabric, the combination with a looper bar having a stay channel in its face, of a series of loopers mounted in the bar, a series of gates guarding the channel, stems extending from the gates and guided in the bar, and means for reciprocating the stems in unison to open and close the gates at the proper time.

129. In a machine for making wire fabric, the combination with a looper including a hook having a reciprocatory shank, of a stay channel leading to the looper, and a gate guarding the channel and having a reciprocatory stem connected to the shank of the looper hook to reciprocate in unison therewith.

130. In a machine for making wire fabric, a traveling rotary looper.

131. In a machine for making wire fabric, a traveling rotary looper including a reciprocatory looper hook.

132. In a machine for making wire fabric, the combination with a traveling rotary looper, including a reciprocatory looper hook, of means operated during the travel of the looper to turn the same on its axis and to reciprocate the hook.

133. In a machine for making wire fabric, the combination with a rotary looper, including a reciprocatory hook, and mounted to travel in an endless orbit, of means inclosed by said orbit for rotating the looper and reciprocating the hook thereof.

134. In a machine for making wire fabric, the combination with a rotary looper, including a reciprocatory hook, mounted to travel in an endless orbit, of fixed cams, and means coöperating with said cams to turn the looper on its axis and to reciprocate the looper hook during the travel of the looper.

135. In a machine for making wire fabric, the combination with a traveling looper, of a rack geared to the looper to rotate the same during its travel, and a fixed cam for reciprocating the rack.

136. In a machine for making wire fabric, the combination with a rotary drum, of a circumferential series of rotary loopers mounted on the drum, racks geared to the loopers, and means common to the several racks for effecting their reciprocation in succession.

137. In a machine for making wire fabric, the combination with a rotary drum, of a circumferential series of rotary loopers mounted thereon, a series of racks geared to the loopers, and a fixed cam mounted within the drum and operatively related to the racks.

138. In a machine for making wire fabric, the combination with a rotary drum, of a series of sets of loopers distributed upon the periphery of the drum, looper rotating racks each common to a set of loopers, and means for reciprocating the racks.

139. In a machine for making wire fabric, the combination with a rotary drum, of a series of sets of rotary loopers distributed about the periphery of the drum, a series of racks each of which is geared to a set of loopers, and a fixed cam disposed to reciprocate the racks in succession.

140. In a machine for making wire fabric, the combination with a rotary drum, of rotary loopers distributed upon the periphery of the drum and including reciprocatory looper hooks, of looper rotating means common to the several loopers, and hook reciprocating means common to the several hooks.

141. In a machine for making wire fabric, the combination with a rotary drum, of a series of sets of rotary loopers distributed about the periphery of the drum and including reciprocatory looper hooks, means compelling simultaneous uniform rotary movement of the loopers comprising each set, means compelling uniform reciprocatory movement of the looper hooks of each set, means for inaugurating the rotary movement of the several sets of loopers in succession during their travel about the axis of the drum, and means for reciprocating the several sets of looper hooks in succession.

142. In a machine for making wire fabric, the combination with a rotary drum, of a series of sets of rotary loopers distributed about the periphery of the drum and each including a reciprocatory looper hook, a looper rotating rack common to each set of loopers, a fixed cam for reciprocating the racks in order during the rotation of the drum, a series of bars each having connection with the several looper hooks of a set, and a fixed cam for operating the bars to reciprocate the sets of looper hooks in order.

143. The combination with a rotary twister, of a relatively stationary center guide extending entirely through the twister and formed with an opening through which a wire is disposed at the axis of the twister, said stationary center guide serving to retain the wire out of contact with the twister as the latter rotates.

144. A rotary twister having a detachable wear-plate secured to one end thereof and provided with an eccentric hook.

145. The combination with a rotary twister provided at one end thereof with a detachable wear-plate having an eccentric hook, of a relatively stationary center guide constituting a journal for the twister and extending entirely through the same to prevent said twister from contacting with the wire around which it rotates.

146. The combination with a rotary twister provided at one end thereof with a detachable wear plate having an eccentric hook, of a relatively stationary center guide constituting a journal for the twister and extending through the same and through the wear plate.

147. The combination with a fixed shaft, of a rotary drum carried thereby, twisters located at the periphery of the drum, means for guiding a plurality of wires over the drum and twister operating mechanism, including a pinion geared to the twisters and a mutilated gear fixed to the shaft within the drum and arranged to mesh with the pinion to operate the same during the rotation of the drum.

148. The combination with a rotary support, of loopers and twisters, and twister operating mechanism including a pinion having a portion of its side cut away to form a locking face, and a mutilated gear provided with a locking flange arranged to engage the locking face of the pinion.

149. The combination with a support, of a pair of slotted guide lugs extending therefrom, a twister rotatably mounted in the lugs and formed with a radial slot and with a pinion located between the lugs, a fixed center guide for the twister, having a longitudinal slot coincident with the slots in the lugs, and gearing engaging the pinion to rotate the twister.

150. The combination with a support, of a pair of slotted guide lugs extended therefrom, a center guide supported at one end only and extended between the lugs, and a twister journaled in the lugs and upon the center guide, said guide being extended entirely through the twister from end to end thereof.

151. In a machine for making wire fabric, the combination with a rotary drum, of two peripheral series of lugs extending around the drum and constituting margin wire guides, rotary twisters mounted in the lugs of each series, means located between the series of twisters for guiding intermediate line wires, and means for feeding stays across the drum in position to be engaged by a pair of twisters and wrapped around the margin wires.

152. In a machine for making wire fabric, the combination with a rotary drum, of two peripheral series of twisters carried by the drum, line wire loopers mounted on the drum between the twisters, a pair of fixed mutilated gears for operating the twisters, and means for feeding stays across the drum in operative proximity to the twisters and loopers.

153. In a machine for making wire fabric, the combination with a twister arranged to twist one wire around another, of a pivoted member movable to sever the wire to be twisted and to simultaneously deflect a severed end of the wire laterally into engagement with the twister.

154. In a machine for making wire fabric, the combination with means for feeding a series of line wires, of a twister, means for feeding a stay wire across the line wires during the advance thereof, and a combined stay wire cutting and deflecting device disposed to sever a stay and to deflect the end of the latter into engagement with the twister.

155. The combination with a twister, of a wire feeding device adjacent thereto, and a pivoted member movable to sever a stay from the wire fed forward by the feeding device and having continued movement to carry the end of the stay laterally to the twister.

156. The combination with a movable support, of means for directing a series of line wires thereover, means movable with the support for feeding a stay wire across the line wires, a stay wire cutter movable with the support, a fixed cam arranged to operate the cutter and twisters arranged to twist the ends of the stays around line wires.

157. In a machine for making wire fabric, the combination with a movable support, of means for feeding a series of line wires thereover, means movable with the support for feeding a stay wire, line wire loopers and stay wire twisters carried by the support, a cutter, and a pair of fixed cams disposed to operate and retract the cutter in succession during the movement of the support.

158. The combination with a movable support, of means for leading a series of line wires thereover, stay wire feeding means movable with the support, a pivoted stay wire cutter likewise carried by the support and provided with a tappet and a tailpiece at opposite sides of its axis, a fixed cutter operating cam located in the path of the tappet to operate the cutter, and a retracting cam located in the path of the tailpiece to effect the subsequent retraction of the cutter.

159. In a machine for making wire fabric, the combination with a rotary drum, of a weaving set carried thereby and including means for guiding margin wires and intermediate line wires, stay wire twisters arranged to rotate around the margin wires, line wire loopers arranged to loop the intermediate line wires, stay wire feeding mechanism arranged to feed a stay wire across the margin wires and through the loops of the intermediate line wires, means for cutting a stay from the stay wire, and means for deflecting the ends of the stay into operative relation with the twisters.

160. In a machine for making wire fabric, the combination with means for looping a line wire, of a rotary member movable to produce sufficient slack in the line wire to accommodate the looping thereof.

161. In a machine for making wire fabric, the combination with means for looping a moving wire, of means for slacking the wire to provide for the loop.

162. In a machine for making wire fabric, the combination with wire feeding means, of means for looping the wire during its movement, and means for effecting a local acceleration of the feed to provide material for the loop.

163. In a machine for making wire fabric, the combination with a traveling wire looper, of means for urging the wire laterally into engagement with the looper.

164. In a machine for making wire fabric, the combination with a traveling line wire looper, of means for deflecting the wire at a point adjacent to the looper to insure its engagement thereby and to produce sufficient slack for the formation of the loop.

165. In a machine for making wire fabric, the combination with a traveling looper arranged to loop a wire in transit, of means for deflecting the wire at opposite sides of the looper to insure its engagement by the latter and to produce sufficient slack for the formation of the loop.

166. In a machine for making wire fabric, the combination with a traveling looper, of a rotary wire depressing and slacking device coöperating therewith.

167. In a machine for making wire fabric, the combination with a traveling looper, of a rotary wire depressing and slacking device coöperating therewith and operated by the movement thereof.

168. The combination with a rotary drum, of a circumferential series of line wire loopers mounted thereon and arranged to form a series of loops in a moving line wire, and a wire depressing and slacking device coöperating with the loopers.

169. In a machine for making wire fabric, the combination with a drum, of a circumferential series of line wire loopers carried thereby to form a series of loops in a moving line wire, and a rotary wire depressing and slacking device coöperating with the loopers.

170. In a machine for making wire fabric, the combination with a rotary drum, of a circumferential series of line wire loopers mounted thereon, spaced line wire guides associated with said loopers, and a rotating wire depressing and slacking device provided with radial teeth meshing with the line wire guides on the drum.

171. In a machine for making wire fabric, the combination with a rotary drum equipped with margin wire guides, intermediate line wire guides, circumferential series of twisters associated with the margin wire guides, circumferential series of line wire loopers associated with the intermediate line wire guides, and stay wire feeding means, of means for crimping the margin wires prior to their delivery to the drum, and line wire depressing and slacking devices arranged to dispose the intermediate line wires into position to be engaged by the loopers and to form in said intermediate line wires sufficient slack for the formation of the loops.

172. In a machine for making wire fabric, the combination with means for advancing a pair of margin wires and a series of intermediate line wires, of mechanism performing the following operations during the transit of the wires: to-wit, the crimping of the margin wires, the looping of the intermediate line wires, the feeding of stays through the loops of the looped wires, and the twisting of the ends of the stays upon the margin wires.

173. In a machine for making wire fabric, the combination with means for forming a loop in a wire, of means for moving the wire, and means for feeding a second wire through the loop while the looped wire is moving.

174. In a machine for making wire fabric, the combination with means for forming a loop in a moving wire, of means for feeding a second wire through the loop, and means for drawing out the loop to intertwist the wires.

175. The combination with a traveling looper, of means for operating the same to form a loop in a moving wire, means for passing a second wire through the loop while the latter is retained by the moving looper, and means for exerting a pull on the looped wire to withdraw the same from the looper and to draw out the loop for the purpose of intertwisting the wires.

176. In a machine for making wire fabric, the combination with a wire weaving drum, of a feed drum engaging the fabric to withdraw the same from the weaving drum and having means for crimping certain of the wires.

177. In a machine for making wire fabric, the combination with weaving mechanism, of a feed drum provided with staggered projections arranged to engage and crimp certain wires of the fabric.

178. In a machine for making wire fabric, the combination with mechanism for interweaving line and stay wires to produce the fabric, of a feed drum provided with sets of radial projections, the projections of each set being disposed in staggered relation to engage and crimp the line wires intermediate of the stay wires.

179. In a machine for making wire fabric, the combination with a rotary weaving drum, of a reel disposed to receive the completed fabric, and a feed drum located between the reel and the weaving drum and engaging the fabric to effect the positive withdrawal thereof from the weaving drum.

180. In a machine for making wire fabric, the combination with a weaving drum and weaving mechanism mounted thereon and arranged to be operated by the movement thereof, of a feed drum arranged to engage the fabric and to operate the weaving drum through the medium of said fabric, and means for applying power to the feed drum.

181. In combination, wire connecting mechanism movable in an endless orbit, means for causing a plurality of wires to move in operative proximity to said mechanism to be connected thereby and to effect the travel of said mechanism.

182. In a machine for connecting angularly related wires including means for feeding a wire longitudinally, means for looping said wire during its advance, and means for feeding a second wire through the loop, the looping means serving to retain the loop while the wire is being fed therethrough and to subsequently release the loop to permit the drawing out of the latter.

183. In a machine for connecting angularly related wires, the combination with means for looping a wire, means for moving said wire longitudinally, and means for passing a second wire through the loop during the longitudinal movement of the looped wire.

184. In a machine for connecting angularly related wires, the combination with traveling looping means arranged to loop a moving wire, of means for feeding a second wire through the loop.

185. The combination with means for looping a plurality of wires, of means for moving said wires in unison, and means for feeding a connecting wire through the loops of the several wires first named during the movement of the looped wires.

186. In a machine for making wire fabric, the combination with means for continuously advancing a plurality of line wires, of means for looping said wires during the movement thereof, and means for feeding a stay through the loops of the several wires during their continued movement.

187. In a machine for making wire fabric, the combination with several sets of traveling line wire loopers, of means for feeding stays to the line wires.

188. In a machine for making wire fabric, the combination with a series of traveling line wire loopers arranged to form successive loops in a line wire, and means for feeding stays through the loops in succession.

189. In a machine for making wire fabric, the combination with a support, of line wire looping means and stay wire twisting means, one of said means being movable in an endless orbit.

190. In a machine for making wire fabric, means for advancing a line wire, and means for looping said wire during its movement.

191. In a machine for making wire fabric, the combination with a looper, of a rotary wire depressing and slacking device coöperating therewith.

192. In a machine for making wire fabric, means for continuously advancing a series of line wires, a stay wire guide movable with the line wires, means operating during the movement of the line wires to feed a stay across the width of the fabric and along the stay wire guide, and mechanism for causing the interlocking of the stay with the several line wires without interrupting the movement of the latter.

193. In a machine for making wire fabric, means for continuously advancing a series of line wires, means located outside of said series of line wires for feeding a stay across said wires, and means for effecting an interlocking connection of the stay with certain or all of the line wires.

194. In a machine for making wire fabric, the combination with means for effecting the continuous uninterrupted advance of a series of line wires, of a stay wire guide movable with the line wires and extending in a direct line transverse to the line wires and entirely across the width of the fabric, means for projecting a stay endwise through the guide during the movement of the latter with the wires, and means for coiling a stay about certain of the line wires during the movement of the latter.

195. In a machine for making wire fabric, the combination with means for forming successive loops in a continuously moving wire, of means for passing other wires through said loops.

196. In a machine for making wire fabric, means for continuously advancing a plurality of wires and feeding means for the remaining wires of the fabric, of means for effecting the connection of the several wires to form meshes, said means including devices for looping certain of the wires.

197. In a machine for making wire fabric, means for continuously advancing a plurality of wires and feeding means for the remaining wires of the fabric, of means for effecting the connection of the several wires to form meshes, said means including devices for looping certain of the wires and other devices for twisting or coiling certain of the wires.

198. In a machine for making wire fabric, the combination with means for continuously advancing a series of line wires, of means for feeding successive stays across the line wires, and mechanism for causing the interlocking of the stays with the several wires, said mechanism including loopers and twisting devices.

199. In a machine for making wire fabric, the combination with means for continuously advancing a plurality of line wires, of means for moving a plurality of stay wires with the line wires, means for feeding each stay wire across the line wires by an uninterrupted motion, said means operating to cause several of the stay wires to be moving at the same time in the act of crossing the line wires, and means for twisting the stays around certain of the line wires.

200. The combination with means for continuously advancing margin wires and intermediate line wires, of means for feeding stays across said wires, and mechanism coöperating with said feeding means to coil the stays upon the margin wires and to cause the intertwisting of said stays with the intermediate line wires.

201. In a machine for making wire fabric, the combination with means for looping a moving line wire and means for feeding a stay through the loop, of means for exerting a pull on the line wire to intertwist the wire and stay.

202. In a machine for making wire fabric, the combination with means for moving a line wire longitudinally and a stay wire sidewise at the same time, of mechanism coöperating with the wire moving means to intertwist the line and stay wires during their movement.

In testimony, that I claim the foregoing as my own, I have hereto affixed my signature in the presence of two witnesses.

ALVA L. KITSELMAN.

Witnesses:
JOHN H. SIGGERS,
FLORENCE WALTER.